United States Patent
Kobayashi

(10) Patent No.: US 8,064,340 B2
(45) Date of Patent: Nov. 22, 2011

(54) QUALITY-DEGRADED PORTION ESTIMATING APPARATUS, QUALITY-DEGRADED PORTION ESTIMATING METHOD, AND QUALITY-DEGRADED PORTION ESTIMATING PROGRAM

(75) Inventor: Masayoshi Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 79 days.

(21) Appl. No.: 12/279,375

(22) PCT Filed: Jan. 31, 2007

(86) PCT No.: PCT/JP2007/051580
§ 371 (c)(1),
(2), (4) Date: Aug. 14, 2008

(87) PCT Pub. No.: WO2007/094170
PCT Pub. Date: Aug. 23, 2007

(65) Prior Publication Data
US 2009/0052343 A1  Feb. 26, 2009

(30) Foreign Application Priority Data
Feb. 16, 2006 (JP) ................. 2006-040038

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. .............................. 370/229; 370/253

(58) Field of Classification Search .............. None
See application file for complete search history.

(56) References Cited

U.S. PATENT DOCUMENTS
6,704,346 B1 * 3/2004 Mansfield ............... 375/136
(Continued)

FOREIGN PATENT DOCUMENTS
JP  2001244946 A  9/2001
(Continued)

OTHER PUBLICATIONS

"Empirical study on locating congested segments over the Internet based on multiple end-to-end path measurements" Tachibana, A.; Ano, S.; Hasegawa, T.; Tsuru, M.; Oie, Y.; This paper appears in: Applications and the Internet, 2005. Proceedings.On pp. 342-351 Current Version Published: Feb. 14, 2005.*

(Continued)

*Primary Examiner* — Xavier Szewai Wong

(57) ABSTRACT

An apparatus includes a collection device, a determining device, and an estimating device. The collection device collects information and flow rates of flows circulated in a network and structural information of the network. The determining device finds links through which the flows pass from the information and the network structural information, and determines the flows based on degrading and non-degrading threshold values. The estimating device, from a set of the links through which the quality-degraded flows pass, outputs a subset having a minimum element number and including a link through which an arbitrary flow among the quality-degraded flows passes. The determining device changes, for a set of the quality-degraded flows that pass a link through which a given quality-non-degraded flow passes, the non-degraded flow number threshold value depending on number of elements of a set. When this threshold value becomes high, the estimating device finds a non-degraded link.

12 Claims, 36 Drawing Sheets

U.S. PATENT DOCUMENTS

| | | | |
|---|---|---|---|
| 7,221,656 B1* | 5/2007 | Aweya et al. | 370/252 |
| 2006/0190620 A1 | 8/2006 | Kobayashi | |
| 2010/0172234 A1* | 7/2010 | Thesling | 370/206 |

FOREIGN PATENT DOCUMENTS

| | | | |
|---|---|---|---|
| JP | 2002271392 A | 9/2002 | |
| JP | 2005049708 A | 2/2005 | |
| JP | 2005167383 A | 6/2005 | |
| JP | 2006238052 A | 9/2006 | |

OTHER PUBLICATIONS

"Simple Network Performance Tomography"; Duffield, Nick. Proceedings of the 3rd ACM SIGCOMM conference on Internet measurement, Miami Beach, FL, USA Session: Tomography; pp. 210-215 Year of Publication: 2003.*

Masayoshi Kobayashi et al.,"Accurate Elimination of Non-Degraded Links in Locating QoS Degradation" IEICE Technical Report IN2005-197, (Mar. 2-3, 2006), vol. 105, No. 628, pp. 243-248.

Masayoshi Kobayashi et al., "Precise Non-Degraded Link Elimination in QoS Degradation Locating", Proceedings of the 2006 IEICE General Conference BS-5-6 (Mar. 8, 2006), pp. S-45-S-46.

Masayoshi Kobayashi et al., "Estimating Points of QoS Degradation in the Network from the Aggregation of Per-Flow Quality Information", Technical Report of IEICE TM2004-107 (Mar. 4, 2005), vol. 104, No. 707, pp. 31-36.

International Search Report for PCT/JP2007/051580 mailed May 15, 2007.

* cited by examiner

FIG. 6

| | TRANSMISSION TERMINAL ADDRESS | RECEPTION TERMINAL ADDRESS | L10 | L20 | L30 | L40 | L50 | L15 | L25 | L35 | L45 | L55 | QUALITY (PACKET LOSS RATE) | FLOW RATE (PACKET NUMBER/SEC) |
|---|---|---|---|---|---|---|---|---|---|---|---|---|---|---|
| F1 | T1_1 | T5_1 | 1 | 1 | | | | | | | | | 0.5% | 20 |
| F2 | T5_2 | T6_2 | | 1 | 1 | 1 | | | | | | | 2.5% | 20 |
| F3 | T1_3 | T6_3 | 1 | 1 | 1 | 1 | | | | | | | 3.5% | 30 |
| F4 | T3_4 | T5_4 | | | | | 1 | | | | | | 1.5% | 20 |
| F5 | T3_5 | T1_5 | | 1 | 1 | | 1 | 1 | | | | | 0.5% | 20 |
| F6 | T1_6 | T3_6 | 1 | | | | 1 | | | | | 1 | 0.5% | 80 |
| F7 | T6_7 | T5_7 | | | 1 | | | | | | 1 | | 2.5% | 20 |
| F8 | T5_8 | T6_8 | | | | 1 | | | | 1 | | | 3.5% | 30 |
| F9 | T2_9 | T5_9 | 1 | 1 | 1 | | 1 | | | | | | 1.0% | 20 |
| F10 | T2_10 | T6_10 | | 1 | 1 | | | | | | | | 2.0% | 20 |
| F11 | T1_11 | T4_11 | 1 | 1 | | | 1 | | | | | | 3.0% | 20 |
| F12 | T3_12 | T4_12 | 1 | | | | | | | | | | 2.1% | 20 |
| F13 | T1_13 | T2_13 | | | 1 | | | | | | | | 0.4% | 20 |
| F14 | T4_14 | T5_14 | | 1 | | 1 | | | | | | | 0.4% | 20 |
| F15 | T4_15 | T6_15 | | | | | | | | | | | 0.4% | 20 |
| F16 | T3_16 | T2_16 | | | | | 1 | | | | | | 0.4% | 20 |

FIG. 7

| | TRANSMISSION TERMINAL ADDRESS | RECEPTION TERMINAL ADDRESS | L10 | L20 | L30 | L40 | L50 | L15 | L25 | L35 | L45 | L55 | QUALITY (PACKET LOSS RATE) | FLOW RATE (PACKET NUMBER/SEC) |
|---|---|---|---|---|---|---|---|---|---|---|---|---|---|---|
| F1 | T1_1 | T5_1 | 1 | 1 | 1 | | | | | | | | 0.4% | 20 |
| F2 | T5_2 | T6_2 | | 1 | 1 | 1 | | | | | | | 2.5% | 20 |
| F3 | T1_3 | T6_3 | 1 | 1 | 1 | 1 | | | | | | | 3.5% | 30 |
| F4 | T3_4 | T5_4 | | | | 1 | 1 | | | | | | 1.5% | 20 |
| F5 | T3_5 | T1_5 | | 1 | | 1 | | | | | | | 0.5% | 20 |
| F6 | T1_6 | T3_6 | 1 | | 1 | | | 1 | | | | | 0.5% | 20 |
| F7 | T6_7 | T5_7 | | | | | | | | 1 | | | 0.4% | 20 |
| F8 | T5_8 | T6_8 | | 1 | 1 | 1 | | | | | | | 0.4% | 30 |
| F9 | T2_9 | T5_9 | | 1 | | | 1 | | | | | | 1.0% | 20 |
| F10 | T2_10 | T6_10 | | 1 | 1 | | | | | | | | 2.1% | 20 |
| F11 | T1_11 | T4_11 | 1 | 1 | 1 | | | | | | | | 3.0% | 20 |
| F12 | T3_12 | T4_12 | | | | 1 | | | | | | | 2.1% | 20 |
| F13 | T1_13 | T2_13 | | | 1 | | | | | | | | 0.4% | 20 |
| F14 | T4_14 | T5_14 | | | | 1 | | | | | | | 0.4% | 20 |
| F15 | T4_15 | T6_15 | | 1 | | | | | | | | | 0.4% | 20 |
| F16 | T3_16 | T2_16 | | | | 1 | | | | | | | 0.4% | 80 |
| NUMBER OF NON-DEGRADED FLOWS | | | 3 | | 1 | 3 | 2 | 2 | 1 | 1 | 1 | 1 | | 20 |

FIG. 8

|     |       |       | L20 | L40 | L50 |
|-----|-------|-------|-----|-----|-----|
| F2  | T5_2  | T6_2  | 1   | 1   | 1   |
| F3  | T1_3  | T6_3  | 1   | 1   |     |
| F10 | T2_10 | T6_10 | 1   | 1   |     |
| F12 | T3_12 | T4_12 | 1   |     | 1   |

FIG. 9

| | TRANSMISSION TERMINAL ADDRESS | RECEPTION TERMINAL ADDRESS | L10 | L20 | L30 | L40 | L50 | L15 | L25 | L35 | L45 | L55 | QUALITY (PACKET LOSS RATE) | FLOW RATE (PACKET NUMBER/SEC) |
|---|---|---|---|---|---|---|---|---|---|---|---|---|---|---|
| F1 | T1_1 | T5_1 | ① | ① | | | | | | | | | 0.4% | 20 |
| F2 | T5_2 | T6_2 | ① | ① | | | | | | | | | 2.5% | 20 |
| F3 | T1_3 | T6_3 | 1 | 1 | 1 | | | | | | | | 3.5% | 30 |
| F4 | T3_4 | T5_4 | | 1 | 1 | | | | | | | | 1.5% | 20 |
| F5 | T3_5 | T1_5 | | 1 | | 1 | ① | | | | | | 0.5% | 20 |
| F6 | T1_6 | T3_6 | ① | | ① | | | | | | | | 0.5% | 20 |
| F7 | T6_7 | T5_7 | | 1 | ① | | | | | 1 | | | 0.4% | 20 |
| F8 | T5_8 | T6_8 | | 1 | | ① | | | | | | | 0.4% | 20 |
| F9 | T2_9 | T5_9 | | 1 | | | | | | | | ① | 1.0% | 30 |
| F10 | T2_10 | T6_10 | | 1 | | 1 | | | | | | | 2.1% | 20 |
| F11 | T1_11 | T4_11 | ① | 1 | | | | | | | | | 3.0% | 20 |
| F12 | T3_12 | T4_12 | | 1 | | | 1 | | | | | | 2.1% | 20 |
| F13 | T1_13 | T2_13 | | | ① | ① | | | | | | | 0.4% | 20 |
| F14 | T4_14 | T5_14 | | | ① | | | | | | | | 0.4% | 20 |
| F15 | T4_15 | T6_15 | | | ① | | | | | | | | 0.4% | 80 |
| F16 | T3_16 | T2_16 | | | | ① | | | | | | | 0.4% | 20 |
| TOTAL RATE OF NON-DEGRADED FLOWS | | | 60 | 20 | 60 | 110 | 40 | 20 | 20 | 20 | 20 | 20 | | |

FIG. 10

|     |       |       | L20 | L50 |
| --- | ----- | ----- | --- | --- |
| F2  | T5_2  | T6_2  | 1   | 1   |
| F3  | T1_3  | T6_3  | 1   |     |
| F10 | T2_10 | T6_10 | 1   |     |
| F12 | T3_12 | T4_12 | 1   | 1   |

FIG. 11

|     |       |       | L10 | L20 | L40 | L50 |
|-----|-------|-------|-----|-----|-----|-----|
| F2  | T5_2  | T6_2  |     | 1   | 1   | 1   |
| F3  | T1_3  | T6_3  | 1   | 1   | 1   |     |
| F10 | T2_10 | T6_10 |     | 1   | 1   |     |
| F12 | T3_12 | T4_12 | 1   | 1   |     |     |

FIG. 13

| MINIMUM ELEMENT NUMBER | NON-DEGRADED FLOW NUMBER THRESHOLD VALUE |
|---|---|
| 1 | 1 |
| 2 | 3 |
| 3 OR MORE | ∞ |

FIG. 14

| | TRANSMISSION TERMINAL ADDRESS | RECEPTION TERMINAL ADDRESS | L10 | L20 | L30 | L40 | L50 | L15 | L25 | L35 | L45 | L55 | QUALITY (PACKET LOSS RATE) | FLOW RATE (PACKET NUMBER/SEC) |
|---|---|---|---|---|---|---|---|---|---|---|---|---|---|---|
| F1 | T1_1 | T5_1 | 1 | 1 | 1 | | | | | | | | 0.4% | 20 |
| F2 | T5_2 | T6_2 | | 1 | | 1 | | | | | | | 2.5% | 20 |
| F3 | T1_3 | T6_3 | | 1 | 1 | 1 | | | | | | | 3.5% | 30 |
| F4 | T3_4 | T5_4 | | 1 | | | 1 | | | | | | 1.5% | 20 |
| F5 | T3_5 | T1_5 | 1 | | | | 1 | 1 | | | | | 0.5% | 20 |
| F6 | T1_6 | T3_6 | | | 1 | 1 | | | | | | 1 | 0.5% | 20 |
| F7 | T6_7 | T5_7 | | | 1 | | | | | | 1 | | 0.4% | 20 |
| F8 | T5_8 | T6_8 | | | | 1 | | | | 1 | | | 0.4% | 20 |
| F9 | T2_9 | T5_9 | | 1 | 1 | 1 | | | | | | | 1.0% | 20 |
| F10 | T2_10 | T6_10 | | 1 | | | 1 | | | | | | 2.1% | 20 |
| F11 | T1_11 | T4_11 | 1 | 1 | | | | | | | | | 3.0% | 20 |
| F12 | T3_12 | T4_12 | | | 1 | 1 | | | | | | | 2.1% | 20 |
| F13 | T1_13 | T2_13 | | | | | | | | | | | 0.4% | 20 |
| F14 | T4_14 | T5_14 | | | | | | | | | | | 0.4% | 20 |
| F15 | T4_15 | T6_15 | | | | | 1 | | | | | | 0.4% | 80 |
| F16 | T3_16 | T2_16 | | | | 2 | 2 | | | | | | 0.4% | 20 |
| NUMBER OF NON-DEGRADED FLOWS | | | 3 | 1 | | | | | | | | | | |

FIG. 15

|  | | | L20 |
|---|---|---|---|
| F2 | T5_2 | T6_2 | 1 |
| F3 | T1_3 | T6_3 | 1 |
| F10 | T2_10 | T6_10 | 1 |
| F12 | T3_12 | T4_12 | 1 |

FIG. 17

| MINIMUM ELEMENT NUMBER | NON-DEGRADED FLOW RATE THRESHOLD VALUE |
|---|---|
| 1 | 60 |
| 2 | 120 |
| 3 OR MORE | ∞ |

FIG. 18

| | TRANSMISSION TERMINAL ADDRESS | RECEPTION TERMINAL ADDRESS | L10 | L20 | L30 | L40 | L50 | L15 | L25 | L35 | L45 | L55 | QUALITY (PACKET LOSS RATE) | FLOW RATE (PACKET NUMBER/SEC) |
|---|---|---|---|---|---|---|---|---|---|---|---|---|---|---|
| F1 | T1_1 | T5_1 | 1 | 1 | | | | | | | | | 0.4% | 20 |
| F2 | T5_2 | T6_2 | | 1 | | 1 | 1 | | | | | | 2.5% | 20 |
| F3 | T1_3 | T6_3 | 1 | 1 | | 1 | | | | | | | 3.5% | 30 |
| F4 | T3_4 | T5_4 | | | | | 1 | | | | | | 1.5% | 20 |
| F5 | T3_5 | T1_5 | | | | | 1 | 1 | | | | | 0.5% | 20 |
| F6 | T1_6 | T3_6 | 1 | | 1 | | | | | | | | 0.5% | 20 |
| F7 | T6_7 | T5_7 | | | 1 | | | | | | | | 0.4% | 20 |
| F8 | T5_8 | T6_8 | | | | 1 | | | | | | | 0.4% | 20 |
| F9 | T2_9 | T5_9 | | 1 | 1 | 1 | | | | | 1 | | 1.0% | 20 |
| F10 | T2_10 | T6_10 | | 1 | | 1 | | | | 1 | | | 2.1% | 20 |
| F11 | T1_11 | T4_11 | 1 | 1 | | | | | | | | | 3.0% | 20 |
| F12 | T3_12 | T4_12 | | | 1 | | 1 | | | | | | 2.1% | 20 |
| F13 | T1_13 | T2_13 | | | | | | | | | | | 0.4% | 20 |
| F14 | T4_14 | T5_14 | | | 1 | | | | | | | | 0.4% | 20 |
| F15 | T4_15 | T6_15 | | | | | 1 | | | | | | 0.4% | 80 |
| F16 | T3_16 | T2_16 | | | | | | | | | | | 0.4% | 20 |
| TOTAL RATE OF NON-DEGRADED FLOWS | | | 60 | 20 | 60 | 110 | 40 | 20 | 20 | 20 | 20 | 20 | | |

FIG. 19

|     |       |       | L20 | L50 |
|-----|-------|-------|-----|-----|
| F2  | T5_2  | T6_2  | 1   | 1   |
| F3  | T1_3  | T6_3  | 1   |     |
| F10 | T2_10 | T6_10 | 1   |     |
| F12 | T3_12 | T4_12 | 1   | 1   |

FIG. 21

| PRESENCE OF LINK | NON-DEGRADED FLOW NUMBER THRESHOLD VALUE |
|---|---|
| YES | 1 |
| NO | ∞ |

FIG. 22

| | TRANSMISSION TERMINAL ADDRESS | RECEPTION TERMINAL ADDRESS | L10 | L20 | L30 | L40 | L50 | L15 | L25 | L35 | L45 | L55 | QUALITY (PACKET LOSS RATE) | FLOW RATE (PACKET NUMBER/SEC) |
|---|---|---|---|---|---|---|---|---|---|---|---|---|---|---|
| F1 | T1_1 | T5_1 | 1 | 1 | 1 | | | | | | | | 0.4% | 20 |
| F2 | T5_2 | T6_2 | | 1 | | 1 | | | | | | | 2.5% | 20 |
| F3 | T1_3 | T6_3 | 1 | 1 | | 1 | | | | | | | 3.5% | 30 |
| F4 | T3_4 | T5_4 | | 1 | 1 | | | | | | | | 1.5% | 20 |
| F5 | T3_5 | T1_5 | 1 | | | | 1 | 1 | | | | | 0.5% | 20 |
| F6 | T1_6 | T3_6 | | | 1 | 1 | 1 | | | | | | 0.5% | 20 |
| F7 | T6_7 | T5_7 | | | | | | | | 1 | | | 0.4% | 20 |
| F8 | T5_8 | T6_8 | | 1 | | 1 | | | | | | | 0.4% | 30 |
| F9 | T2_9 | T5_9 | | 1 | | | | | | | 1 | | 1.0% | 20 |
| F10 | T2_10 | T6_10 | 1 | | 1 | | 1 | | | | | | 2.1% | 20 |
| F11 | T1_11 | T4_11 | | 1 | | 1 | | | | | | | 3.0% | 20 |
| F12 | T3_12 | T4_12 | | | | | | | | | | 1 | 2.1% | 20 |
| F13 | T1_13 | T2_13 | | | | | | | | | | | 0.4% | 20 |
| F14 | T4_14 | T5_14 | | | 1 | | | | | | | | 0.4% | 20 |
| F15 | T4_15 | T6_15 | | | | 1 | 1 | | | | | | 0.4% | 80 |
| F16 | T3_16 | T2_16 | 3 | 1 | | 2 | 2 | | | | | | 0.4% | 20 |
| NUMBER OF NON-DEGRADED FLOWS | | | | | | | | | | | | | | |

FIG. 23

|  | | | L20 |
|---|---|---|---|
| F2 | T5_2 | T6_2 | 1 |
| F3 | T1_3 | T6_3 | 1 |
| F10 | T2_10 | T6_10 | 1 |
| F12 | T3_12 | T4_12 | 1 |

FIG. 25

| PRESENCE OF LINK | NON-DEGRADED FLOW RATE THRESHOLD VALUE |
|---|---|
| YES | 60 |
| NO | ∞ |

FIG. 26

| | TRANSMISSION TERMINAL ADDRESS | RECEPTION TERMINAL ADDRESS | L10 | L20 | L30 | L40 | L50 | L15 | L25 | L35 | L45 | L55 | QUALITY (PACKET LOSS RATE) | FLOW RATE (PACKET NUMBER/SEC) |
|---|---|---|---|---|---|---|---|---|---|---|---|---|---|---|
| F1 | T1_1 | T5_1 | 1 | 1 | 1 | | | | | | | | 0.4% | 20 |
| F2 | T5_2 | T6_2 | 1 | 1 | 1 | 1 | | | | | | | 2.5% | 20 |
| F3 | T1_3 | T6_3 | 1 | 1 | | 1 | | | | | | | 3.5% | 30 |
| F4 | T3_4 | T5_4 | | 1 | 1 | 1 | | | | | | | 1.5% | 20 |
| F5 | T3_5 | T1_5 | | 1 | | | 1 | 1 | | | | | 0.5% | 20 |
| F6 | T1_6 | T3_6 | 1 | | 1 | 1 | | | | | | | 0.5% | 20 |
| F7 | T6_7 | T5_7 | | | 1 | | | | | 1 | | | 0.4% | 20 |
| F8 | T5_8 | T6_8 | | | | 1 | | | | | 1 | | 0.4% | 30 |
| F9 | T2_9 | T5_9 | | 1 | 1 | | | | | | | | 1.0% | 20 |
| F10 | T2_10 | T6_10 | | 1 | 1 | | | | | | | | 2.1% | 20 |
| F11 | T1_11 | T4_11 | | 1 | | | | | | | | | 3.0% | 20 |
| F12 | T3_12 | T4_12 | | | 1 | 1 | | | | | | | 2.1% | 20 |
| F13 | T1_13 | T2_13 | | | 1 | | | | | | | | 0.4% | 20 |
| F14 | T4_14 | T5_14 | | | | 1 | | | | | | | 0.4% | 20 |
| F15 | T4_15 | T6_15 | | | | | 1 | | | | | | 0.4% | 80 |
| F16 | T3_16 | T2_16 | | | | | | | | | | | 0.4% | 20 |
| TOTAL RATE OF NON-DEGRADED FLOWS | | | 60 | 20 | 60 | 110 | 40 | 20 | 20 | 20 | 20 | 20 | | |

FIG. 27

|     |       |       | L20 | L50 |
|-----|-------|-------|-----|-----|
| F2  | T5_2  | T6_2  | 1   | 1   |
| F3  | T1_3  | T6_3  | 1   |     |
| F10 | T2_10 | T6_10 | 1   |     |
| F12 | T3_12 | T4_12 | 1   | 1   |

FIG. 30

|    | L10 | L20 | L30 | L45 | L50 | L40 | QUALITY (PACKET LOSS RATE) |
|----|-----|-----|-----|-----|-----|-----|---------------------------|
| F1 | 1   | 1   | 1   |     |     |     | 3.0% |
| F2 |     | 1   | 1   |     | 1   |     | 2.5% |
| F3 |     | 1   |     |     |     | 1   | 3.5% |
| F4 |     | 1   |     |     |     |     | 1.0% |
| F5 |     |     | 1   | 1   |     |     | 0.5% |

FIG. 31

|    | L10 | L20 | L30 | L45 | L50 | L40 | QUALITY (PACKET LOSS RATE) |
|----|-----|-----|-----|-----|-----|-----|----------------------------|
| F1 | 1   | 1   | 1   |     |     |     | 3.0%                       |
| F2 |     | 1   | 1   |     | 1   |     | 2.5%                       |
| F3 |     | 1   |     |     |     | 1   | 3.5%                       |
| F4 |     | 1   |     |     |     |     | 1.0%                       |
| F5 |     |     | ①   | ①   |     |     | 0.5%                       |

FIG. 32

|    | L10 | L20 | L50 | L40 |
|----|-----|-----|-----|-----|
| F1 | 1   | 1   |     |     |
| F2 |     | 1   | 1   |     |
| F3 |     | 1   |     | 1   |

FIG. 33

|  | L10 | L20 | L30 | L45 | L50 | L40 | QUALITY (PACKET LOSS RATE) |
|---|---|---|---|---|---|---|---|
| F1 | 1 | 1 | 1 |  |  |  | 3.0% |
| F2 |  | 1 | 1 |  | 1 |  | 2.5% |
| F3 |  | 1 |  |  |  | 1 | 3.5% |
| F4 |  | ①|  |  |  |  | 0.5% |
| F5 |  |  | ① | ① |  |  | 0.5% |

FIG. 34

|  | L10 | L20 | L50 | QUALITY (PACKET LOSS RATE) |
|---|---|---|---|---|
| F1 | 1 |  |  | 3.0% |
| F2 |  | 1 |  | 2.5% |
| F3 |  |  | 1 | 3.5% |

FIG. 35

|    | L10 | L20 | L30 | L45 | L50 | L40 | QUALITY (PACKET LOSS RATE) |
|----|-----|-----|-----|-----|-----|-----|----------------------------|
| F1 | 1   | 1   | 1   |     |     |     | 3.0%                       |
| F2 |     | 1   | 1   |     | 1   |     | 2.5%                       |
| F3 |     | ①   |     |     |     | ①   | 0.5%                       |
| F4 |     | 1   |     |     |     |     | 3.5%                       |
| F5 |     |     | ①   | ①   |     |     | 0.5%                       |

FIG. 36

|    | L10 | L50 | QUALITY (PACKET LOSS RATE) |
|----|-----|-----|------|
| F1 | 1   |     | 3.0% |
| F2 |     | 1   | 2.5% |
| F4 |     |     | 3.5% |

QUALITY-DEGRADED PORTION ESTIMATING APPARATUS, QUALITY-DEGRADED PORTION ESTIMATING METHOD, AND QUALITY-DEGRADED PORTION ESTIMATING PROGRAM

TECHNICAL FIELD

The present invention relates to a quality-degraded portion estimating apparatus, a quality-degraded portion estimating method, and a quality-degraded portion estimating program for estimating a communication-quality degraded portion in a communication network system.

RELATED ART

In order to specify a communication-quality degraded portion rapidly when the communication quality is degraded in a communication network, a following method is employed. That is, first, a great number of monitoring devices are provided within the network to monitor the communication quality constantly at positions where the monitors are provided. When there is degradation of the communication quality, the section with the degraded quality is estimated based on positional information of the monitoring device that has monitored the quality degradation.

However, this method requires a great number of monitoring devices to improve the accuracy for estimating the quality-degraded position, so that the cost for providing the monitoring devices is high. As a way to cope with such issue, there has been conventionally proposed a method which estimates a quality-degraded portion from quality information and routing information of communication flows that pass through a network (see Patent Document 1).

First of all, the method of this conventional case will be described.

First, there is created a corresponding table (flow-link corresponding table) of each flow, respective links (directed links) through which the flows go through, and the qualities. It is assumed then that there are flows F1-F5 existed in a network containing routers (or packet switches) R1-R6 as shown in FIG. 28, for example.

Names are applied as in FIG. 29 to the links of the network shown in FIG. 28, and packet loss rate is used to show the qualities thereof. Provided that the packet loss rates of the flows F1-F5 are 3.0%, 2.5%, 3.5%, 1.0%, and 0.5%, the flow-link corresponding table becomes the one as in FIG. 30. It is assumed here that a hundred packets per second go through as each flow, and the packet loss rate is calculated based on the number of lost packets every two seconds.

Then, non-degraded link removing processing is performed. That is, based on a degrading threshold value and a non-degrading threshold value of the flow quality determined in advance, a flow with a quality worse than the degrading threshold value is considered a degraded flow, a flow with a quality better than the non-degrading threshold value is considered a non-degraded flow, and other flows are considered intermediate-quality flows. Then, from the flow-link corresponding table, there is created a reduced flow-link corresponding table in which a row of the intermediate-quality flow, the row of the non-degraded flow, and the columns of the links through which the non-degraded flows transmit through are eliminated.

In the above case, when the packet loss rate 2% is considered as the degrading threshold vale and 1% as the non-degrading threshold value, for example, the degraded flows are F1-F3, the non-degraded flow is F5, and the intermediate flow is F4. Then, from the flow-link corresponding table, the row of the intermediate flow is eliminated and the row of the degraded flow as well as the columns having "1" in the row of the non-degraded flow are eliminated to create a reduced flow-link table.

FIG. 31 shows the state of elimination in the above case, and FIG. 32 shows the reduced flow-link corresponding table. At last, the degraded portion is estimated based on FIG. 32. For example, with an estimating method based on the number of quality-degraded flows, the number of quality-degraded flows that go through each of the links L10, L20, L50, L40 in FIG. 32 is "1", "3", "1", "1", respectively, and the link L20 that has the largest number of flows passing therethrough is estimated as the degraded portion. Alternatively, the degraded portion is estimated by estimating the minimum link number in the manner as will be described below.

With the minimum link number estimating method, sets of flows going through each link shown in FIG. 32 are considered. In the minimum number of links, a link set covering all the flows of FIG. 32 is obtained to take it as a degraded link set.

That is, in the case of FIG. 32, the sets of flows that go through each of the links L10, L20, L50, L40 are {F1}, {F1, F2, F3}, {F2}, {F3}, respectively. For example, a union of the flow sets that go through the link set {L10, L50, L40} that is configured with three links is {F1, F2, F3}, which can cover all the flows. Other than that, the link set {L10, L20} configured with two links and the link set {L20} configured with a single link can also cover all the flows. Among the link sets that cover all the flows, the set {L20} with the minimum number of link is estimated as the minimum link set.

Patent Document 1: Japanese Unexamined Patent Publication 2002-271392

DISCLOSURE OF THE INVENTION

With the conventional quality-degraded portion estimating method described above, time required for estimation is shortened by reducing the size of the flow-link table through eliminating the non-degraded links. Further, the estimation accuracy is improved through eliminating the links with non-degraded quality so that the links with non-degraded quality are not included in the result of estimation.

However, not all the flows that go through the quality-degraded link have its quality degraded. It is possible to have such a case where a flow that happens to go through the quality-degraded link has a better quality than the non-degrading threshold value.

For example, in a case where the packet loss rate is used as a quality index, it may happen that there is no packet loss occurred even though a flow has passed through a degraded link, and the packet loss rate of that flow becomes lower than the non-degrading threshold value.

Thus, with the conventional quality-degraded portion estimating method, a real quality-degraded link may be eliminated when eliminating the non-degraded link. Therefore, there may be a case of issuing a mis-warning by overlooking a quality-degraded portion or judging a non-degraded link as a degraded link. In other cases, it is possible that a degraded portion cannot be found by the minimum link number estimation.

For example, it is assumed in the above case that the real quality-degraded link is L20 and the qualities of the other links are not degraded. If the packet loss rate of the flow F4 during a given measurement time is as low as 0.5% even if it has passed through L20, the flow-link corresponding table becomes the one as in FIG. 33. When the non-degraded link is eliminated, the reduced flow-link corresponding table becomes the one as in FIG. 34.

Then, when the quality-degraded portion is estimated based on the reduced flow-link corresponding table shown in FIG. 34, the tree links L10, L50, L40 are estimated as the degraded links by both the estimating method based on the number of quality-degraded flows and the minimum link number estimating method. This means to have such an overlook that the real quality-degraded link L20 cannot be found, and to have mis-warning by estimating the three non-degraded links L10, L50, L40 as the degraded links.

As another example, it is assumed in the above case that the true quality-degraded link is L20 and the other links are non-degraded links.

Provided that the packet loss rate of the flow F3 during a given measurement time is as low as 0.5% even if it has passed through L20 and the flow F4 is degraded and the packet loss rate thereof is 3%, the flow-link corresponding table becomes the one as in FIG. 35.

When the non-degraded links are eliminated, the reduced flow-link corresponding table becomes the one as in FIG. 36. With the estimating method based on the number of quality-degraded flows, L10 and L50 are estimated as the degraded portions. With the minimum link number estimating method, no link set covering all the degraded flows F1, F2, and F4 is found, so that estimation is failed.

It is an object of the present invention to improve the inconveniences of the conventional cases and to achieve a quality-degraded portion estimating apparatus, a quality-degraded portion estimating method, and a quality-degraded portion estimating program, which can estimate a quality-degraded portion with high accuracy based on flow quality information. At the same time, it is an object of the present invention to achieve a quality-degraded portion estimating apparatus, a quality-degraded portion estimating method, and a quality-degraded portion estimating program, which can estimate the quality-degraded portion rapidly.

A quality-degraded portion estimating apparatus according to the invention includes: an information collection device which collects quality information and flow rates of flows circulated in a network as well as structural information of the network; a quality-degraded flow/quality-non-degraded flow determining device which finds links through which the flows pass from the flow quality information and the network structural information collected by the information collection device, and determines quality-degraded flows and quality-non-degraded flows based on a degrading threshold value and a non-degrading threshold value determined in advance; and a quality-degraded portion estimating device which, from a set of the links through which the quality-degraded flows pass, outputs as quality-degraded portions, a subset having a minimum element number and including a link through which an arbitrary flow among the quality-degraded flows passes, which is among subsets of the link set from which the link having number of passing quality-non-degraded flows equal to or larger than a non-degraded flow number threshold value that is determined based on the degrading threshold value and the flow rate is eliminated.

This makes it possible to eliminate the non-degraded links with sufficiently high probability by removing the non-degraded links that have the number of passing quality-non-degraded flows equal to or more than the non-degraded flow number threshold value that is determined based on the degrading threshold value and the flow rate. Therefore, it is possible to improve the accuracy for estimating the degraded links.

Further, a quality-degraded portion estimating apparatus according to the invention includes: an information collection device which collects quality information and flow rates of flows circulated in a network as well as structural information of the network; a quality-degraded flow/quality-non-degraded flow determining device which finds links through which the flows pass from the flow quality information and the network structural information collected by the information collection device, and determines quality-degraded flows and quality-non-degraded flows based on a degrading threshold value and a non-degrading threshold value determined in advance; and a quality-degraded portion estimating device which, from a set of the links through which the quality-degraded flows pass, outputs as quality-degraded portions, the links of pre-determined order and higher (in order of the links having a larger number of passing quality-degraded flows) among the link set from which the link having number of passing quality-non-degraded flows equal to or larger than a non-degraded flow number threshold value that is determined based on the degrading threshold value and the flow rate is eliminated.

This makes it possible to eliminate the non-degraded links with sufficiently high probability by removing the non-degraded links that have the number of passing quality-non-degraded flows equal to or more than the non-degraded flow number threshold value that is determined based on the degrading threshold value and the flow rate. In this respect, it is possible to improve the accuracy for estimating the degraded links.

Furthermore, a quality-degraded portion estimating apparatus according to the invention includes: an information collection device which collects quality information and flow rates of flows circulated in a network as well as structural information of the network; a quality-degraded flow/quality-non-degraded flow determining device which finds links through which the flows pass from the flow quality information and the network structural information collected by the information collection device, and determines quality-degraded flows and quality-non-degraded flows based on a degrading threshold value and a non-degrading threshold value determined in advance; and a quality-degraded portion estimating device which, from a set of the links through which the quality-degraded flows pass, outputs as quality-degraded portions, a subset having a minimum element number and including a link through which an arbitrary flow among the quality-degraded flows passes, which is among subsets of the link set from which the link having total rate of passing quality-non-degraded flows equal to or larger than a non-degraded flow rate threshold value that is determined based on the degrading threshold value and the flow rate is eliminated.

This makes it possible to eliminate the non-degraded links with sufficiently high probability by removing the non-degraded links that have the total flow rate of passing quality-non-degraded flows equal to or more than the non-degraded flow rate threshold value that is determined based on the degrading threshold value and the flow rate. In this respect, it is possible to improve the accuracy for estimating the degraded links.

Further, a quality-degraded portion estimating apparatus according to the invention includes: an information collection device which collects quality information and flow rates of flows circulated in a network as well as structural information of the network; a quality-degraded flow/quality-non-degraded flow determining device which finds links through which the flows pass from the flow quality information and the network structural information collected by the information collection device, and determines quality-degraded flows and quality-non-degraded flows based on a degrading threshold value and a non-degrading threshold value determined in advance; and a quality-degraded portion estimating device which, from a set of the links through which the quality-degraded flows pass, outputs as quality-degraded portions, the links of pre-determined order and higher (in order of the links having a larger number of passing quality-degraded flows) among the link set from which the link having total rate of passing quality-non-degraded flows equal to or larger than a non-degraded flow number threshold value that is determined based on the degrading threshold value and the flow rate is eliminated.

This makes it possible to eliminate the non-degraded links with sufficiently high probability by removing the non-degraded links that have the total flow rate of passing quality-non-degraded flows equal to or more than the non-degraded flow rate threshold value that is determined based on the degrading threshold value and the flow rate. In this respect, it is possible to improve the accuracy for estimating the degraded links.

Note here that the above-described quality-degraded flow/quality-non-degraded flow determining device may be structured to change, for a set of the quality-degraded flows that pass a link through which a given quality-non-degraded flow passes, the non-degraded flow number threshold value depending on number of elements of a set configured with minimum number of links among link sets in which a set of flows configured with quality-degraded flows that pass any of links of a link set through which any of the flows in the quality-degraded flow set passes includes the set of the quality-degraded flows.

Thus, when it is possible to select, regarding all the quality-degraded flows that pass the links, a set of other links that pass any of the element links, the non-degraded flow number threshold value may be changed depending on the number of elements in the minimum link set, and the non-degraded link having the number of passing quality-non-degraded flows equal to or larger than the non-degraded flow number threshold value that is determined based on the degrading threshold value and the flow rate may be eliminated. This makes it possible to eliminate the non-degraded link with sufficiently high probability. Therefore, it is possible to achieve the quality-degraded portion estimating apparatus that is capable of improving the accuracy for estimating the degraded link.

Further, the above-described quality-degraded flow/quality-non-degraded flow determining device changes, for a set of the quality-degraded flows that pass a link through which a given quality-non-degraded flow passes, the non-degraded flow rate threshold value depending on number of elements of a set configured with minimum number of links among link sets that do not include the link, in which a set of flows configured with quality-degraded flows that pass any of links of a link set through which any of the flows in the quality-degraded flow set passes includes the set of the quality-degraded flows.

Thus, when it is possible to select, regarding all the quality-degraded flows that pass the links, a set of other links that pass any of the element links, the non-degraded flow rate threshold value may be changed depending on the number of elements in the minimum link set, and the non-degraded link having the total rate of passing quality-non-degraded flows equal to or larger than the non-degraded flow rate threshold value that is determined based on the degrading threshold value and the flow rate may be eliminated. This makes it possible to eliminate the non-degraded link with sufficiently high probability. Therefore, it is possible to achieve the quality-degraded portion estimating apparatus that is capable of improving the accuracy for estimating the degraded link.

Furthermore, the above-described quality-degraded flow/quality-non-degraded flow determining device may be structured to change, for a set of the quality-degraded flows that pass a link through which a given quality-non-degraded flow passes, the non-degraded flow number threshold value depending on presence of a link through which all the flows in the set of the quality-degraded flows pass and one or more quality-degraded flow that is not included in the set of the quality-degrade flows passes.

Thus, it is possible to achieve the quality-degraded portion estimating apparatus that is capable of improving the accuracy further for estimating the degraded link, through changing the threshold value depending on presence of the link through which all the flows in the set of the quality-degraded flows pass and one or more quality-degraded flow that is not included in the set of the quality-degrade flows passes.

Further, the above-described quality-degraded flow/quality-non-degraded flow determining device may be structured to change, for a set of the quality-degraded flows that pass a link through which a given quality-non-degraded flow passes, the non-degraded flow rate threshold value depending on presence of a link through which all the flows in the set of the quality-degraded flows pass.

This makes it possible to achieve the quality-degraded portion estimating apparatus that is capable of improving the accuracy further for estimating the degraded link, through changing, for the set of the quality-degraded flows that pass the link through which the given quality-non-degraded flow passes, the threshold value depending on presence of the link through which all the flows in the set of the quality-degraded flows pass.

Further, in a quality-degraded portion estimating method according to the present invention, actions of each device of the quality-degraded portion estimating apparatus according to the present invention described above are considered as procedures, and steps of the procedures of the actions are executed as the way to achieve the foregoing objects. Furthermore, a quality-degraded portion estimating program according to the present invention is configured to enable a computer to execute each procedure of the quality-degraded portion estimating method.

The present invention is structured and functions as described above, with which the non-degrade links can be eliminated efficiently. Therefore, accuracy of estimating the degraded links can be improved, so that the quality-degraded portions can be estimated with high accuracy.

BEST MODE FOR CARRYING OUT THE INVENTION

Exemplary embodiments of the invention will be described hereinafter by referring to the accompanying drawings.

First, basic structures of each exemplary embodiment will be described. Then, the exemplary embodiments will be described in a concretive manner.

As shown in FIG. 1-FIG. 3, reference numeral 10 shows a quality-degraded portion estimating server as a quality-degrade portion estimating apparatus. As a basic structure, the quality-degraded portion estimating server 10 according to a first exemplary embodiment includes: a flow quality collection unit 11 as a flow quality collection device for collecting quality information and rates of flows that transmit through a network; a route information collection unit 12 as a route information collection device for collecting structural information of the network; and a flow quality/route link table managing unit 13 as a flow quality/route link table managing device which finds links through which the flows transmit based on the flow quality information and the structural information of the network, and manages those in a form of table.

Further, the quality-degraded portion estimating server 10 according to the first exemplary embodiment includes: a non-degraded link removing unit 15 as a non-degraded link removing device which, when there is degradation of the quality in one or more flows in the managing table, determines a quality-degraded flow and a quality-non-degraded flow based on a degrading threshold value and a non-degrading threshold value set in advance, and eliminates, from a link set through which the quality-degraded flows pass, the degraded links through which the number of passing quality-degraded flows is equal to or more than a non-degrading flow number threshold value that is determined based on the degrading threshold value and the flow rate; a quality-degraded portion estimating unit 17 which outputs, as quality-degraded portion, a subset containing links through which an arbitrary quality-degraded flow passes and containing a minimum number of element among subsets of a set obtained by eliminating the non-degraded links from the links through which a set of arbitrary quality-degraded flows pass; and a display unit 18 for displaying the information regarding the outputted quality-degraded portion.

As in the case of the above-described first exemplary embodiment, a quality-degraded portion estimating apparatus according to a second exemplary embodiment includes, as a basic structure: a flow quality collection unit 11 for collecting quality information and rates of flows that transmit through a network; a route information collection unit 12 for collecting structural information of the network; and a flow quality/route link table managing unit 13 which finds links through which the flow transmits based on the flow quality information and the structural information of the network, and manages those in a form of table.

Further, the quality-degraded portion estimating server 10 according to the second exemplary embodiment includes: a non-degraded link removing unit 15 which, when there is degradation of the quality in one or more flows in the managing table, determines a quality-degraded flow and a quality-non-degraded flow based on a degrading threshold value and a non-degrading threshold value determined in advance, and eliminates, from a set of links through which the quality-degraded flow passes, a non-degraded link that has the number of passing quality-non-degraded flows equal to or more than a non-degraded flow number threshold value that is determined based on the degrading threshold value and flow rate; a quality-degraded portion estimating unit 17 which functions to output, as quality-degraded portion, among the set obtained by eliminating the non-degraded link from the links through which a set of arbitrary quality-degraded flows passes, the links having the larger number (the largest predetermined order and higher) of passing quality-degraded flows in order from the one with the larger number to the one with the smaller number; and a display unit 18 for displaying the information regarding the outputted quality-degraded portion.

In the second exemplary embodiment, the processing action of the non-degraded link removing unit 15 of the quality-degraded portion estimating server 10 is different from that of the above-described first exemplary embodiment.

As in the case of the above-described first exemplary embodiment, a quality-degraded portion estimating apparatus according to a third exemplary embodiment includes, as a basic structure: a flow quality collection unit 11 for collecting quality information and rates of flows that transmit through a network; a route information collection unit 12 for collecting structural information of the network; and a flow quality/route link table managing unit 13 which finds links through which the flow transmits based on the flow quality information and the structural information of the network, and manages those links in a form of table.

Further, the quality-degraded portion estimating server according to the third exemplary embodiment includes: a non-degraded link removing unit 15 as a non-degraded link removing device which, when there is degradation of the quality in one or more flows in the managing table, determines a quality-degraded flow and a quality-non-degraded flow based on a degrading threshold value and a non-degrading threshold value set in advance, and eliminates, from a link set through which the quality-degraded flows pass, the degraded links through which total rate number of passing quality-non-degraded flows is equal to or more than a non-degrading flow rate threshold value that is determined based on the degrading threshold value and the flow rate; a quality-degraded portion estimating unit 17 which outputs, as quality-degraded portion, a subset containing links through which an arbitrary quality-degraded flow passes and containing a minimum number of element among subsets of a set obtained by eliminating the non-degraded links from the links through which a set of arbitrary quality-degraded flows pass; and a display unit 18 for displaying the information regarding the outputted quality-degraded portion.

In the third exemplary embodiment, the processing action of the non-degraded link removing unit 15 of the quality-degraded portion estimating server 10 is different from that of the above-described first exemplary embodiment.

As in the case of the above-described first exemplary embodiment, a quality-degraded portion estimating apparatus according to a fourth exemplary embodiment includes: a flow quality collection unit 11 for collecting quality information and rates of flows that transmits through a network; a route information collection unit 12 for collecting structural information of the network; and a flow quality/route link table managing unit 13 which finds links through which the flow transmits based on the flow quality information and the structural information of the network, and manages those links in a form of table.

Further, the quality-degraded portion estimating server 10 according to the fourth exemplary embodiment includes: a non-degraded link removing unit 15 as a non-degraded link removing device which, when there is degradation of the quality in one or more flows in the managing table, determines a quality-degraded flow and a quality-non-degraded flow based on a degrading threshold value and a non-degrading threshold value set in advance, and eliminates, from a link set through which the quality-degraded flows pass, the degraded links through which total rate number of passing quality-degraded flows is equal to or more than a non-degrading flow rate threshold value that is determined based on the degrading threshold value and the flow rate; a quality-degraded portion estimating unit 17 which functions to output, as quality-degraded portion, among the set obtained by eliminating the non-degraded link from the links through which a set of arbitrary quality-degraded links passes, the links having the larger number (the largest predetermined order and higher) of passing quality-degraded flows in order from the one with the larger number to the one with the smaller number; and a display unit 18 for displaying the information regarding the outputted quality-degraded portion.

In the fourth exemplary embodiment, the processing action of the non-degraded link removing unit 15 of the quality-degraded portion estimating server 10 is different from that of the above-described first exemplary embodiment.

Further, in the first exemplary embodiment, when the non-degraded link removing unit 15 can select, regarding all the quality-degraded flows that pass the links, a set of other links that pass any of the element links, the non-degraded flow number threshold value may be changed depending on the number of elements in the minimum link set. This exemplary embodiment is considered as a fifth exemplary embodiment. Furthermore, in the third exemplary embodiment, when the non-degraded link removing unit 15 can select, regarding all the quality-degraded flows that pass the links, a set of other links that pass any of the element links, the non-degraded flow number threshold value may be changed depending on the number of elements in the minimum link set. This exemplary embodiment is considered as a sixth exemplary embodiment.

In the first-fourth exemplary embodiments described above, the quality-degraded portion estimating apparatus eliminates the non-degraded links having the number of passing quality-non-degraded flows equal to or more than the non-degraded flow number threshold value that is determined based on the degrading threshold value and the flow rate so as to eliminate the non-degraded links with sufficiently high probability. Therefore, it is possible to improve the accuracy for estimating the degraded links.

Further, in the third and fourth exemplary embodiments, the quality-degraded portion estimating apparatus eliminates the non-degraded links having the total rate of passing quality-non-degraded flows equal to or more than the non-degraded flow rate threshold value that is determined based on the degrading threshold value and the flow rate so as to eliminate the non-degraded links with sufficiently high probability. Therefore, it is possible to improve the accuracy for estimating the degraded links.

Further, when the quality-degraded portion estimating device according to the fifth exemplary embodiment can select, regarding all the quality-degraded flows that pass the links, a set of other links that pass any of the element links, the non-degraded flow number threshold value is changed depending on the number of elements in the minimum link set. Then, the quality-degraded portion estimating apparatus eliminates the non-degraded links having the number of passing quality-non-degraded flows equal to or more than the non-degraded flow number threshold value that is determined based on the degrading threshold value and the flow rate so as to eliminate the non-degraded links with sufficiently high probability. Therefore, it is possible to improve the accuracy for estimating the degraded links in this respect.

When the quality-degraded portion estimating device according to the sixth exemplary embodiment can select, regarding all the quality-degraded flows that pass the links, a set of other links that pass any of the element links, the non-degraded flow rate threshold value is changed depending on the number of elements in the minimum link set. Then, the quality-degraded portion estimating apparatus eliminates the non-degraded links having the total flow rate of passing quality-non-degraded flows equal to or more than the non-degraded flow rate threshold value that is determined based on the degrading threshold value and the flow rate so as to eliminate the non-degraded links with sufficiently high probability. Therefore, it is possible to improve the accuracy for estimating the degraded links in this respect.

Next, each of the exemplary embodiments will be described in a concretive manner.

First Exemplary Embodiment

FIG. 1 shows a block diagram of the network according to the first exemplary embodiment of the present invention. Routers (or switches) R1-R6 and the quality-degraded portion estimating server 10 are provided in this network and, as shown in FIG. 1, terminals having addresses of T11-T1n-T61-T6n, which belong to the routers, are connected to the routers R1-R6. Flows F1-F5 are formed between each of the routers R1-R6 that are included in the network. The flows F1-F5 are bidirectional flows with a transmission system and a reception system, so that link names are given to the transmission system and reception system of the flows F1-F5 as shown in FIG. 2. That is, for the flow F1 shown in FIG. 1, "link L10" is given to the transmission-system flow and "link L15" is given to the reception-system flow. For the flow F2 shown in FIG. 1, "link L20" is given to the transmission-system flow and "link L25" is given to the reception-system flow. For the flow F3 shown in FIG. 1, "link L30" is given to the transmission-system flow and "link L35" is given to the reception-system flow. For the flow F4 shown in FIG. 1, "link L40" is given to the transmission-system flow and "link L45" is given to the reception-system flow. For the flow F5 shown in FIG. 1, "link L50" is given to the transmission-system flow and "link L55" is given to the reception-system flow.

In FIG. 1, the terminals connected to the routers R1-R6 function as transmission terminals or reception terminals having the addresses of T11-T1n-T61-T6n. In the explanations provided below, when the terminals having the addresses T11-T1n-T61-T6n function as the transmission terminals, those are expressed as transmission terminals TS1-TS5. When the terminals having the addresses T11-T1n-T61-T6n function as the reception terminals, those are expressed as reception terminals TR1-TR5.

In FIG. 2, link names are also given to the links between each of the routers R1-R6. However, link names for the links formed between the routers R1-R6 and the terminals having the addresses of T11-T1n-T61-T6n are omitted. In FIG. 1 and FIG. 2, it is illustrated that the transmission terminals TS1-TS5 and the reception terminals TR1-TR5 perform transmission/reception only with their partner terminals connected via a single flow. However, it is noted that the transmission terminals TS1-TS5 and the reception terminals TR1-TR5 are to perform transmission/reception with the partner terminals via a plurality of flows.

Further, FIG. 3 shows an internal block diagram of the quality-degraded portion estimating server 10 according to the first exemplary embodiment. In FIG. 3, as described above, the quality-degraded portion estimating server 10 includes: the flow quality collection unit 11 as a flow quality collection device; the route information collection unit 12 as a route information collection device; and the flow quality/route link table managing unit 13 as a flow quality/route link table managing device.

Further, the quality-degraded portion estimating server 10 includes: the non-degraded link removing unit 15 as a non-degraded link removing device which eliminates the non-degraded links based on a prescribed condition; the quality-degraded portion estimating unit 17 which outputs, as quality-degraded portion, a subset containing links through which an arbitrary quality-degraded flow passes and containing a minimum number of element among subsets of a set obtained by eliminating the non-degraded links; and the display unit 18 for displaying the information regarding the outputted quality-degraded portion.

These units practically collect quality information for each flow form the terminals TS1-TS5 and TR1-TR5, estimate the quality-degraded portions based on the route information obtained from the routers (or switches) R1-R6, and output the estimation result to the display unit 18.

In the first exemplary embodiment, an information collection device 101 is configured with the flow quality information collection unit 11 and the route information collection unit 12, and a quality-degraded flow/quality-non-degraded flow determining device 102 is configured with the flow quality/route link table managing unit 13, a flow quality/route link table storage unit 14, the non-degraded link removing unit 15, and a reduced flow quality/route link table storage unit 16. Further, a quality-degraded portion estimating device 103 is configured with the quality-degraded portion estimating unit 17 and the display unit 18.

Next, specific contents of each of the above-described constituent elements will be described.

(Flow Quality Information Collection Unit 11)

When the terminals start communications, the flow quality information collection unit 11 is informed from the terminals TS1-TS5 and TR1-TR5 to start the communication and, after starting the communications, receive current communication quality information and flow rates of the terminals TS1-TS5 and TR1-TR5 from the terminals TS1-TS5 and TR1-TR5. That is, the flow quality information collection unit 11 receives groups of information containing the addresses of transmission terminals TS1-TS5, addresses of the reception terminals TR1-TR5, the flow quality information, and the packet rates. When the terminals TS1-TS5 and TR1-TR5 end the communication, the flow quality information collection unit 11 receives notification from the terminals indicating that the communication has been ended. The flow quality information is information regarding the communication quality such as packet loss rate, delay, delay jitter, and the like. The packet rate is information regarding the number of packets in the flow used in the communication per second.

(Route Information Collection Unit 12)

The route information collection unit 12 collects information regarding routing from the routers (or switches) R1-R6. It is possible to collect the information by using SMTP (Simple Network Management Protocol) or the like. When there is information regarding routing, the route information collection unit 12 determines through which of the routes the communication between the transmission and reception terminals TS1-TS5, TR1-TR5 are performed, from the address information of the transmission and reception terminals TS1-TS5, TR1-TR5. Specifically, when collecting the information from the routers, the route information collection unit 12 collects a routing table and an ARP table. When collecting the information from the switches other than the routers, the route information collection unit 12 collects a forwarding database and structural information of a spanning tree. This information can be supplied from a network administrator to the route information collection unit 12, instead of the route information collection unit 12 to collect it from the routers (or switches) R1-R6.

(Flow Quality/Route Link Table Managing Unit 13)

Regarding the currently communicating flows, the flow quality/route link table managing unit 13 keeps a flow quality/route link table that contains the addresses of the transmission and reception terminals TS1-TS5 and TR1-TR5, a set of the links through which the flows are currently passing, the current flow qualities of the flows, and the information of the flow rates, based on the flow quality information obtained from the flow quality information collection unit 11 and the information regarding the routing from the route information collection unit 12.

Note here that the links are the directed links between the routers (or switches) R1-R6, and between the router (or switches) R1-R6 and the terminals TS1-TS5, TR1-TR5. For example, in the case of the block diagram of the network shown in FIG. 1, the links are the directed links as in FIG. 2.

FIG. 4 shows a flowchart of the actions of the flow quality/route link table managing unit 13. In FIG. 4, when the flow quality/route link table managing unit 13 receives flow quality information from the flow quality information collection unit 11 (step S101) and if it indicates end of communication (step S102), the flow quality/route link table managing unit 13 eliminates that flow from the flow quality/route link table (step S105). If it indicates start of communication (step S103), the flow-quality/route link table managing unit 13 obtains the information regarding the current routing from the route information collection unit 12 and determines the route link from the information regarding the addresses of the transmission terminals TS1-TS5 and the addresses of the reception terminals TR1-TR5 of the flow quality information (step S106), and registers it to the flow quality/route link table (step S107). When it is not the information indicating start of communication, it is to inform the latest communication qualities of the currently registered flows. Thus, the communication quality information of the flow quality/route link table managing unit 13 and the flow quality/route link table is updated (step S104).

When the route information is received from the route information collection unit 12 (step S108) and if there is a change in the route information (step S109), the flow quality/route link table managing unit 13 determines the route links for all the flows that are registered to the current flow quality/route link table based on the information regarding the addresses of the transmission terminals TS1-TS5 and the addresses of the reception terminals in the table and the information (after being changed) regarding the current routing, and updates the flow quality/route link table (step S200).

(Flow Quality/Route Link Table Storage Unit 14)

The flow quality/route link table storage unit 14 stores information regarding the flow quality/route links that are managed by the flow quality/route link table managing unit 13.

(Non-Degraded Link Removing Unit 15)

The non-degraded link removing unit 15 periodically reads out information of the flow quality/route link table from the flow quality/route link table storage unit 14, and extracts a row of the flow whose quality is worse than the degrading threshold value that is determined in advance. When there is a flow whose quality is worse than the degrading threshold value, the non-degraded link removing unit 15 performs non-degraded link removing processing by a non-degraded link judging method that will be described next, generates a reduced flow quality/route table from which the quality information as well as flow rate information is eliminated, and writes it to the reduced flow quality/route table storage unit 16.

(Non-Degraded Link Judging Method (1))

The non-degraded link removing unit 15 judges a flow whose quality information indicates that the quality of the flow is better than the non-degrading threshold value that is determined in advance as a non-degraded flow, and judges the link having equal to or larger number of non-degraded flows than the non-degraded flow number threshold value that is determined in advance as a non-degraded link.

FIG. 5 shows a flowchart of the actions of the non-degraded link removing unit 15. The non-degraded link removing unit 15 reads the flow quality/route link table from the flow quality/route link table storage unit 14 (step S201), and judges whether or not there is a quality-degraded flow (step S202). When judged that there is a quality-degraded flow, the non-degraded link removing unit 15 extracts the row that includes the quality-degraded flow (step S203), cancels the quality-non-degraded link by the non-degraded link judging method (step S204), and writes the reduced flow quality/route link table obtained as a result to the reduced flow quality/route link table storage unit 16. When judged in step S202 that there is no quality-degraded flow, the non-degraded link removing unit 15 ends the processing there.

FIG. 6 shows an example of the flow quality/route link table. In FIG. 6, when the non-degraded link judging method (1) is used and it is assumed that the packet loss rate "2%" is the degrading threshold value, the packet loss rate "0.6%" is the non-degrading threshold value, and the non-degrading flow number threshold value is "2", the degraded flows shown with thick frames in FIG. 7 are selected. The links (links shown with vertical dotted lines) through which two or more non-degraded flows shown with lateral dotted lines pass are eliminated. Thereby, the reduced flow quality/route table as shown in FIG. 8 can be obtained.

(Quality-Degraded Portion Estimating Unit 17)

The quality-degraded portion estimating unit 17 reads out the reduced flow quality/route table from the reduced flow/route table storage unit 16, estimates the quality-degraded portion by using the estimating method based on the number of quality-degraded flows or the minimum link number estimating method, and outputs it to the display unit 18.

When using the estimating method based on the number of quality-degraded flows, the quality-degraded portion estimating unit 17 counts the number of "1" in each column of the reduced flow/route table, arranges those in order from the one having a greater number of "1" to the one with lesser, and estimates the links of the predetermined orders thereof as the degraded portions. For example, the number of "1" in the links L20, L40, L50 in the case of the reduced flow/route link table shown in FIG. 8, for example, is four, three, two, respectively. When the links to the second largest (second order) among those are to be estimated as the degraded portions, L20 and L40 are estimated as the degraded portions. When the link with the largest number (first order) is to be estimated as the degraded portion, L20 is estimated as the degraded portion.

When the quality-degraded portion estimating unit 17 uses the estimating method based on the minimum number of links, a set of flows having "1" in the columns of the route links in the flow quality/route link table is considered a set of flows that belong to the columns of the links. In the case of the reduced flow quality/route link table shown in FIG. 8, for example, the flow set belonging to the column of route link L20 is {F2, F3, F10, F12}. Further, a union of the sets of flows belonging to each of a plurality of route link columns is also a set of flows belonging to the set of the link columns. For example, in the case of the reduced flow quality/route link table shown in FIG. 8, the flow set belonging to the set of the link columns {L40, L50} is {F2, F3, F10, F12}.

(Minimum Link Number Estimating Method)

When using the estimating method based on the minimum number of links, the quality-degraded portion estimating unit 17 selects the flow set belonging to the sets of the link columns with the minimum number of elements from the set of the route link columns that have a set of same flows as the whole flows of the reduced flow quality/route link table. For example, there is described a case where the minimum link number estimating method is executed on the reduced flow quality/route link table.

The link sets having the flow set belonging to the sets of the rout link columns includes the whole flows of the reduced flow/route link table, i.e., the link set having the flow set of {F2, F3, F10, F12} are {L20}, {L20, L40}, {L20, L50}, {L40, L50}, {L20, L40, L50}. However, the link set with the minimum number of element is only {L20} (the number of element is one). Therefore, the quality-degraded portion estimating unit 17 estimates L20 as the degraded link. The minimum link number estimation can be done by using algorithm of a minimum coverage problem.

With the first exemplary embodiment, it is possible to eliminate only the non-degraded link with sufficiently high probability when eliminating the non-degraded link.

For example, it is assumed that the link L20 is a real degraded link in the flow quality/route link table shown in FIG. 6. The flow F1 is a flow whose flow quality happens to be high (low packet loss rate) because it has passed through the degraded link.

Further, when the non-degraded link removing processing is performed by employing a conventional method by having the packet loss rate "0.6%" as a non-degrading threshold value, which is the same as the proposed method, the flow F1 is eliminated because it goes through the link L20. Thus, the estimation accuracy is deteriorated. Furthermore, if a value less than 0.4% is selected as the non-degrading threshold value so that the flow F1 is not included, the flows F5, F6, F7, F8, F13-F16 are considered as non-degraded flows. Thus, the size of the reduced flow quality/route link table becomes expanded as in FIG. 11, thereby increasing the estimation time.

In the meantime, the first exemplary embodiment employs the non-degraded link judging method 1 to eliminate only the links through which a plurality of non-degraded flows pass so as to decrease the probability of removing a degraded link accidentally because it happens to include a flow with a fine quality. Thereby, the link L10 can be eliminated while preventing the link L20 from being eliminated. The first exemplary embodiment makes it possible to control the probability of accidentally removing the degraded link because it happens to include a flow with a fine quality, by changing the non-degrading flow number threshold value in accordance with the degrading threshold value.

Second Exemplary Embodiment

Next, the second exemplary embodiment of the present invention will be described.

In the second exemplary embodiment, the processing actions of the non-degraded link removing processing unit 15 of the quality-degraded portion estimating server 10 are different from those of the first exemplary embodiment. Thus, the different points thereof will be described hereinafter.

(Non-Degraded Link Removing Unit 15)

The non-degraded link removing unit 15 periodically reads out the flow quality/route link table from the flow quality/route link table storage unit 14, and extracts a row of the flow whose quality is worse than the degrading threshold value that is determined in advance. When there is a flow whose quality is worse than the degrading threshold value, the non-degraded link removing unit 15 performs non-degraded link removing processing by a non-degraded link judging method (2) to generate a reduced flow quality/route table from which the quality information as well flow rate information is eliminated, and writes it to the reduced flow quality/route table storage unit 16.

(Non-Degraded Link Judging Method (2))

When using the non-degraded link judging method (2), the non-degraded link removing unit 15 judges a flow whose quality information indicates that the quality of the flow is better than the non-degrading threshold value that is determined in advance and judges, as non-degraded links, the links having the non-degraded flows whose total flow rate (sum of the flow rates) equal to or larger than the non-degraded flow rate threshold value that is determined in advance based on measurement intervals and the degrading threshold value.

In FIG. 6, when the non-degraded link judging method (2) is used and it is assumed that the packet loss rate "2%" is the degrading threshold value, the packet loss rate "0.6%" is the non-degrading threshold value, and the non-degrading flow rate threshold value is "60 packets/sec", the non-degraded link removing unit 15 selects the degraded flows shown with thick frames in FIG. 9, and eliminates the links (links shown with vertical dotted lines) whose total rate of the non-degraded flows is equal to or more than 60 packets/sec shown with lateral dotted lines. Thereby, the reduced flow quality/route table as shown in FIG. 10 can be obtained.

With the second exemplary embodiment, it is possible to eliminate only the non-degraded link with sufficiently high probability when eliminating the non-degraded link.

For example, it is assumed that the link L20 is a real degraded link in the flow quality/route link table shown in FIG. 6. The flow F1 is a flow whose flow quality happens to be high (low packet loss rate) because it has passed through the degraded link. When the non-degraded link removing processing is performed by employing a conventional method by having the packet loss rate "0.6%", which is the same as the proposed method, as the non-degrading threshold value, the flow F1 is eliminated because it goes through the link L20. Thus, the estimation accuracy is deteriorated.

Furthermore, if a value less than 0.4% is selected as the non-degrading threshold value so that the flow F1 is not included, the flows F5, F6, F7, F8, F13-F16 are considered as non-degraded flows. Thus, the size of the reduced flow quality/route link table becomes expanded as in FIG. 11, thereby increasing the estimation time.

In the meantime, the second exemplary embodiment employs the non-degraded link judging method (2) to eliminate only the links having the non-degraded flows whose total flow rate exceeds the non-degraded flow rate threshold value so as to decrease the probability of removing a degraded link accidentally because it happens to include a flow with a fine quality. Thereby, the links L10 and L40 can be eliminated while preventing the link L20 from being eliminated. The second exemplary embodiment makes it possible to control the probability of accidentally removing the degraded link because it happens to include a flow with a fine quality, by changing the non-degraded flow rate threshold value in accordance with the degrading threshold value.

Third Exemplary Embodiment

Next, the third exemplary embodiment of the present invention will be described. In the third exemplary embodiment, only the processing actions of the non-degraded link removing processing unit 15 of the quality-degraded portion estimating server 10 are different from those of the first exemplary embodiment. Thus, the different points thereof will be described hereinafter.

(Non-Degraded Link Removing Unit 15)

The non-degraded link removing unit 15 periodically reads out the flow quality/route link table from the flow quality/route link table storage unit 14, and extracts a row of the flow (degraded flow) whose quality is worse than the degrading threshold value that is determined in advance. When there is a flow whose quality is worse than the degrading threshold value, the non-degraded link removing unit 15 eliminates a non-degraded link set R that is determined by a non-degraded link judging method (3), generates a reduced flow quality/route table by eliminating the quality information and flow rate information, and writes it to the reduced flow quality/route table storage unit 16.

(Non-Degraded Link Judging Method (3))

When using the non-degraded link judging method (3), the non-degraded link removing unit 15 finds a set of degraded flows that pass through all the links through which one or more degraded flow passes. In the followings, it is noted that a degraded flow included in a given link means a degraded flow that passes through that link, and degraded flows included in a given link set means a set of degraded flows that pass through at least one of those links.

FIG. 12 shows a flowchart of the actions of the degraded-link judging method employed in the third exemplary embodiment. It is assumed here that the flows having the flow quality information indicating a better quality than the non-degrading threshold value that is determined in advance are the non-degraded flows.

The non-degraded link removing unit 15 considers a set of all the links through which the degraded flow passes as "L0", and "R" as an empty set (step S301). It is assumed that "L=L0". When "L" mentioned above is an empty set, the non-degraded link removing unit 15 ends the processing (step S302). When the "L" is not an empty set, the non-degraded link removing unit 15 selects a link v from the "L" and eliminates the link v from the "L" (step S303). It is assumed that "T" represents the set L0 of all the links from which the link v and the elements of the empty set R are eliminated.

The non-degraded link removing unit 15 judges whether or not the link v passes through one non-degraded flow or more (step S304). When the link v passes through one non-degraded flow or more, the non-degraded link removing unit 15 shifts the processing to step S305 and, if not, returns the processing to step S302. When shifting the processing to step S305, the non-degraded link removing unit 15 finds a degraded flow set that includes the link v. The non-degraded link removing unit 15 finds element number X of a subset that has the minimum number of elements from subsets that include the degraded flow set, based on a subset of the "T" (step S305). When the degraded flow set cannot be included, the non-degraded link removing unit 15 considers the number of elements as infinite no matter what kind of the subset it is.

The non-degraded link removing unit 15 determines a non-degraded flow number threshold value according to the element number X obtained in step S305 from a corresponding table determined in advance (step S306). When the number of non-degraded flows passing through the link v is equal to or more than the non-degraded flow number threshold value obtained in step S306 (step S307), the non-degraded link removing unit 15 adds the link v to the eliminated link set R (step S308). Thereafter, the non-degraded link removing unit 15 shifts the processing to step S302.

It is to be determined in advance in the corresponding table of the non-degraded flow number threshold values according to the minimum element number used in step S306 that the non-degraded flow number threshold value increases as the minimum element number increases, and that the non-degraded flow number threshold value becomes ∞ when the minimum element number is ∞.

The link included in the set R when the above-described procedure ends is the non-degraded link to be eliminated.

Next, described is the action of the non-degraded link removing unit 15 that uses the non-degraded link judging method (3) by referring to the case of the flow quality/route link table shown in FIG. 6.

It is assumed here that the number of elements and the non-degraded flow threshold values in step S306 are the values shown in FIG. 13. Further, the packet loss rate "2%" is considered the degrading threshold value, and the packet loss rate "0.6%" is considered the non-degrading threshold value.

First, those shown with thick frames in FIG. 14 are the degraded flows. Further, flows shown with lateral dotted lines are the non-degraded flows.

In step S301, L={L10, L20, L40, L50}, t={L10, L20, L40, L50}, and R={ }. In step S302, provided that v=L10, there are obtained "L={L20, L40, L50}" and "T={L20, L40, L50}".

In step S304, the number of non-degraded flows passing through v is "3". In step S305, the degraded flow set included in v is {F3, F11}, which is included in the degraded flow set {F2, F3, F10, F11} that is included in L20. Thus, the minimum element number X is "1".

In step S306, the non-degraded flow number threshold value corresponding to the minimum element number "1" in FIG. 13 is "1". Since the non-degraded flow number "3" is larger than the threshold value "1" in step S307, there is obtained "R={L10}" in step S308. Thereafter, the processing is returned to step S302.

In step S302, it is assumed that v=L20. Thereby, there are obtained "L={L40, L50}" and "T={L40, L50}". In step S304, the number of the non-degraded flow passing through v is "1". In step S305, the degraded flow set included in v is {F2, F3, F10, F11}, and there is no subset of "L" that includes the degraded flow set. Thus, the minimum element number X is ∞.

Next, in step S305, the non-degraded flow number threshold value corresponding to the minimum element number ∞ is ∞ in FIG. 13. Since the non-degraded flow number "3" is less than the threshold value in step S307, it is remained as "R={L10}" in step S308. Then, the processing is returned to step S302 again.

In step S302, it is assumed that v=L40. Thereby, there are obtained "L={L50}" and "T={L20, L50}". In step S304, the number of the non-degraded flows passing through v is "2". In step S305, the degraded flow set included in v is {F2, F3, F10}, and the degraded flow set {F2, F3, F10, F11} included in "{L20}" that is a subset of T includes the degraded flow set. Thus, the minimum element number X is "1".

In step S306, the non-degraded flow number threshold value corresponding to the minimum element number "1" is "1" in FIG. 13. Since the non-degraded flow number "2" exceeds the threshold value "1" in step S307, there is obtained "R={L10, L40} in step S308. The processing is returned to step S302 again.

In step S302, it is assumed that v=L40. Thereby, there are obtained "L={ }" and "T={L20}". In step S304, the number of the non-degraded flows passing through v is "2". In step S305, the degraded flow set included in v is {F2}, and the degraded flow set {F2, F3, F10, F11} included in "{L20}" that is a subset of T includes the degraded flow set. Thus, the minimum element number X is "1".

In step S306, the non-degraded flow number threshold value corresponding to the minimum element number "1" is "1" in FIG. 13. Since the non-degraded flow number "2" exceeds the threshold value "1" in step S307, there is obtained "R={L10, L40, L50} in step S308. The processing is returned to step S302 again.

In step S302, "L" is an empty set. Thus, the processing is ended.

Therefore, "R={L10, L40, L50}" are eliminated as the non-degraded links as in FIG. 14 to obtain the reduced flow/link table as shown in FIG. 15.

(Quality-Degraded Portion Estimating Unit 17)

The quality-degraded portion estimating unit 17 reads out the reduced flow quality/route table from the reduced flow quality/route table storage unit 16, and estimates the quality-degraded portion based on the reduced flow quality/route table by using the minimum link number estimating method.

With the third exemplary embodiment, it is possible to eliminate only the non-degraded link with sufficiently high probability when eliminating the non-degraded link.

Assuming that the degradation probabilities of each link are the same, it is considered that explaining the current degraded state with the degraded links of the smallest possible number can provide a proper explanation with still higher probability under the condition where the current degraded state has occurred. It is because the probability of having degradation in a plurality of links simultaneously becomes smaller as the number of links increases.

Therefore, when the number of links in the minimum link number estimation result increases by removing a certain link as the non-degraded link, it is highly probable that the judgment made to consider the link as the non-degraded link is a mistake. The more the minimum element number in step S306 of the non-degraded link judging method 3 becomes larger than "1", the more the number of degraded links obtained as a result of the minimum link number estimation becomes increased when the link is eliminated.

Further, it is determined in advance in the corresponding table of the non-degraded flow number threshold values for the minimum element number that the non-degraded flow number threshold value increases as the minimum element number increases.

With the above, there is performed the non-degraded link elimination with which the number of degraded links obtained as a result of the minimum link number estimation increases, only when there are a great number of non-degraded flows, i.e., only when the probability of having degradation is high. Therefore, the probability of performing proper elimination of the non-degraded links can be increased.

Fourth Exemplary Embodiment

In the fourth exemplary embodiment, only the processing actions of the non-degraded link removing processing unit 15 of the quality-degraded portion estimating server 10 are different from those of the first exemplary embodiment. Thus, only the different points thereof will be described hereinafter.

(Non-Degraded Link Removing Unit 15)

The non-degraded link removing unit 15 periodically reads out the flow quality/route link table from the flow quality/route link table storage unit 14, and extracts a row of the flow (degraded flow) whose quality is worse than the degrading threshold value that is determined in advance. When there is a flow whose quality is worse than the degrading threshold value, the non-degraded link removing unit 15 eliminates a non-degraded link set R that is determined by a non-degraded link judging method (4), generates a reduced flow quality/route table by eliminating the quality information and flow rate information, and writes it to the reduced flow quality/route table storage unit 16.

(Non-Degraded Link Judging Method (4))

There is obtained a set of degraded flows that pass through all the links through which one or more degraded flow passes. In the followings, it is noted that a degraded flow included in a given link means a degraded flow that passes through that link, and degraded flows included in a given link set means a set of degraded flows that pass through at least one of those links.

It is assumed here that the flows having the flow quality information indicating a better quality than the non-degrading threshold value that is determined in advance are the non-degraded flows.

FIG. 16 shows a flowchart of the actions of the degraded-link judging method employed in the fourth exemplary embodiment.

In step S401, it is considered that a set of all the links through which the degraded flow passes as "L0" and "R" as an empty set. Further, it is assumed that "L=L0".

When "L" is an empty set in step S402, the processing is ended. When the "L" is not an empty set, a link v is selected from the "L" and the link v is eliminated from "L" in step S403. It is assumed that "T" represents the set of all the links L0 from which the link v and the elements of "R" are eliminated.

It is judged in step S404 whether or not one or more non-degraded flow passes through the link v. When one or more non-degraded flow passes through the link v, it is judged whether or not the total of the non-degraded flow rates is equal to or more than the non-degraded flow number threshold value. When the total of the rates is equal to or more than the non-degraded flow rate threshold value, the processing is shifted to step S405. If not, the processing is returned to step S402.

In step S405, there is obtained a set of degraded flows that are included in the link v. There is obtained the number X of elements of a subset that has the minimum number of elements from subsets that include the degraded flow set, based on a subset of the "T". When the degraded flow set cannot be included, the number of elements is considered as infinite no matter what kinds of subset it is.

In step S406, the non-degraded flow rate threshold value according to the element number X obtained in step S405 is determined from a corresponding table that is determined in advance.

In step S407, the links having the total rate of the non-degraded flows passing therethrough equal to or more than the non-degraded flow rate threshold value obtained in step S406 are added to the eliminated link set R (step S408). Thereafter, the processing is returned to step S402.

It is to be determined in advance in the corresponding table of the non-degraded flow rate threshold value according to the minimum element number used in step S406 that the non-degraded flow rate threshold value increase as the minimum element number increases, and that the non-degraded flow number threshold value becomes ∞ when the minimum element number is ∞.

The link included in the set R when the above-described procedure ends is the non-degraded link to be eliminated.

Next, described is the action of the non-degraded link removing unit 15 that uses the non-degraded link judging method (4) by referring to the case of the flow quality/route link table shown in FIG. 6. It is assumed here that the number of elements and the non-degraded flow rate threshold values used in step S406 are the values shown in FIG. 17. Further, the packet loss rate "2%" is considered as the degrading threshold value, and the packet loss rate "0.6%" is considered as the non-degrading threshold value.

First, those shown with thick frames in FIG. 18 are the degraded flows. Further, flows shown with lateral dotted lines are the non-degraded flows.

In step S401, L={L10, L20, L40, L50}, T={L10, L20, L40, L50}, and R={ }. In step S402, provided that v=L10, there are obtained "L={L20, L40, L50}" and "T={L20, L40, L50}".

In step S404, the total rate of non-degraded flows passing through the link v is 60 packets/sec. In step S405, the degraded flow set included in the link v is {F3, F11}, which is included in the degraded flow set {F2, F3, F10, F11} that is included in L20. Thus, the minimum element number X is "1".

In step S406, the non-degraded flow rate threshold value corresponding to the minimum element number "1" is "60" in FIG. 17. Since the total rate "60" of the non-degraded flows is equal to or larger than the threshold value, there is obtained "R={L10}" in step S408. Thereafter, the processing is returned to step S402 again.

In step S402, it is assumed that v=L20. Thereby, there are obtained "L={L40, L50}" and "T={L40, L50}". In step S404, the total rate of the non-degraded flows passing through v is 20 packets/sec. In step S405, the degraded flow set included in v is {F2, F3, F10, F11}, and there is no subset of "L" that includes the degraded flow set. Thus, the minimum element number X is ∞.

In step S406, the non-degraded flow rate threshold value corresponding to the minimum element number ∞ is ∞ in FIG. 17. Since the total rate "20 packets/sec" of the non-degraded flows is less than the threshold value ∞, it is remained as "R={L10}" in step S408. Thereafter, the processing is returned to step S402 again.

In step S402, it is assumed that v=L40. Thereby, there are obtained "L={L50} and "T={L20, L50}". In step S404, the total rate of the non-degraded flows passing through v is "60 packets/sec". In step S405, the degraded flow set included in v is {F2, F3, F10}, and the degraded flow set {F2, F3, F10, F11} included in "{L20}" that is a subset of T includes the degraded flow set. Thus, the minimum element number X is "1". In step S406, the non-degraded flow rate threshold value corresponding to the minimum element number "1" is "60" in FIG. 13. Since the total rate "60" of the non-degraded flows is equal to or larger than the threshold value, there is obtained "R={L10, L40}" in step S408. Thereafter, the processing is returned to step S402 again.

In step S402, it is assumed that v=L50. Thereby, there are obtained "L={ }" and "T={L20}". In step S404, the total rate of the non-degraded flows passing through v is "110 packets/sec". In step S405, the degraded flow set included in v is {F2}, and the degraded flow set {F2, F3, F10, F11} included in "{L20}" that is a subset of T includes the degraded flow set. Thus, the minimum element number X is "1".

In step S406, the non-degraded flow rate threshold value corresponding to the minimum element number "1" is "60" in FIG. 13. Since the total rate of the non-degraded flow number "40 packets/sec" is less than the threshold value, there is obtained "R={L10, L40}" in step S408. The processing is returned to step S402 again. In step S402, "L" is an empty set. Thus, the processing is ended.

Therefore, "R={L10, L40}" are eliminated as the non-degraded links to obtain the reduced flow/link table as shown in FIG. 19.

(Quality-Degraded Portion Estimating Unit 17)

The quality-degraded portion estimating unit 17 reads out the reduced flow quality/route table from the reduced flow quality/route table storage unit 16, and estimates the quality-degraded portion based on the reduced flow quality/route table by using the minimum link number estimating method.

With the fourth exemplary embodiment, it is possible to eliminate only the non-degraded link with sufficiently high probability when eliminating the non-degraded link.

Assuming that the degradation probabilities of each link are the same, it is considered that explaining the current degraded state with the degraded links of the smallest possible number can provide a proper explanation with still higher probability under the condition where the current degraded state has occurred. It is because the probability of having degradation of a plurality of links simultaneously becomes smaller as the number of links increases.

Therefore, when the number of links in the minimum link number estimation result increases by removing a given link as the non-degraded link, it is highly probable that the judgment made to consider the link as the non-degraded link is a mistake. The more the minimum element number in step S406 of the non-degraded link judging method 4 becomes larger than "1", the more the number of degraded links obtained as a result of the minimum link number estimation becomes increased when the link is eliminated. Further, it is determined in advance in the corresponding table of the non-degraded flow rate threshold value for the minimum element number that the non-degraded flow rate threshold value increases as the minimum element number increases. With the above, in the fourth exemplary embodiment, there is performed the non-degraded link elimination with which the number of degraded links obtained as a result of the minimum link number estimation increases, only when there are a great number of non-degraded flows, i.e., only when the probability of having degradation is high. Therefore, the probability of performing proper elimination of the non-degraded links can be increased.

Fifth Exemplary Embodiment

In the fifth exemplary embodiment, only the processing actions of the non-degraded link removing processing unit 15 of the quality-degraded portion estimating server 10 are different from those of the first exemplary embodiment. Thus, only the different points thereof will be described hereinafter.

(Non-Degraded Link Removing Unit 15)

The non-degraded link removing unit 15 periodically reads out the flow quality/route link table from the flow quality/route link table storage unit 14, and extracts a row of the flow (degraded flow) whose quality is worse than the degrading threshold value that is determined in advance. When there is a flow whose quality is worse than the degrading threshold value, the non-degraded link removing unit 15 eliminates a degraded link set R that is determined by a non-degraded link judging method (5), generates a reduced flow quality/route table by eliminating the quality information and flow rate information, and writes it to the reduced flow quality/route table storage unit 16.

(Non-Degraded Link Judging Method (5))

In the non-degraded link judging method (5) used by the non-degraded link removing unit 15, there is obtained a set of degraded flows that pass through all the links through which one or more degraded flow passes. In the followings, it is noted that a degraded flow included in a given link means a degraded flow that passes through that link, and degraded flows included in a given link set means a set of degraded flows that pass through at least one of those links. It is assumed here that the flows having the flow quality information indicating a better quality than the non-degrading threshold value that is determined in advance are the non-degraded flows.

FIG. 20 shows a flowchart of the actions of the degraded-link judging method (5) performed by the non-degraded link removing unit 15 in the fifth exemplary embodiment.

In step S501, it is considered that a set of all the links through which the degraded flow pass as "L0" and "R" as an empty set. Further, it is assumed that "L=L0". When the set of all the links "L" is an empty set in step S502, the processing is ended. When the set of all the links "L" is not an empty set, a link v is selected from the "L" and the link v is eliminated from the set of all the links "L" in step S503. It is assumed that "T" represents the set of all the links L0 from which the link v and the elements of the empty set "R" are eliminated.

It is judged in step S504 whether or not one or more non-degraded flow passes through the link v. When one or more non-degraded flow passes through the link v, the processing is shifted to step S505. If not, the processing is returned to step S502.

In step S505, there is obtained a set of degraded flows that are included in the link v. It is checked to find out if there is any link included in "T", which has a larger number of elements in the flow set than the element number of the degraded flow set by one or more and includes the degraded flow set that is included in the link v.

In step S506, the non-degraded flow number threshold value according to the presence of the link checked in step S505 is determined from a corresponding table that is determined in advance. In step S507, if the number of non-degraded flows passing through the link v is equal to or more than the non-degraded flow number threshold value obtained in step S506, the link v is added to the eliminated link set R in step S508. Thereafter, the processing is returned to step S502.

It is to be determined in advance in the corresponding table of the non-degraded flow number threshold value used in step S506 that the non-degraded flow number threshold value becomes when there is no link found in step S505.

The link included in the set R when the above-described procedure ends is the non-degraded link to be eliminated.

Next, described is the action of the non-degraded link removing unit 15 that uses the non-degraded link judging method (5) by referring to the case of the flow quality/route link table shown in FIG. 6.

It is assumed here that the number of elements and the non-degraded flow threshold values used in step S506 are the values shown in FIG. 21. Further, the packet loss rate "2%" is considered as the degrading threshold value, and the packet loss rate "0.6%" is considered as the non-degrading threshold value.

First, those shown with thick frames in FIG. 22 are the degraded flows. Further, flows shown with lateral dotted lines are the non-degraded flows.

In step S501, L={L10, L20, L40, L50}, T={L10, L20, L40, L50}, and R={ }. In step S502, it is assumed that V=L10. Thereby, there are obtained "L={L20, L40, L50}" and "T={L20, L40, L50}".

In step S504, the number of non-degraded flows passing through v is "3". In step S505, the degraded flow set included in v is {F3, F11}, so that the number of elements is "2". The degraded flow set included in the link L20 is {F2, F3, F10, F11}, so that the number of elements is "4". This is larger than the element number "2" of the degraded flow set included in the link v, and it includes the degraded flow set that is included in the link v. Thus, there are links that satisfy the condition in step S505.

In step S506, the non-degraded flow number threshold value corresponding to the case where there is a link is "1" in FIG. 21. Since the non-degraded flow number "3" passing through the link v is larger than the non-degraded flow number threshold value "1", there is obtained "R={L10}" in step S508. The processing is returned to step S502 again.

In step S502, it is assumed that v=L20. Thereby, there are obtained "L={L40, L50}" and "T={L40, L50}". In step S504, the number of the non-degraded flow passing through the link v is "1". In step S505, the degraded flow set included in v is {F2, F3, F10, F11}, and a link that includes the flow set is not included in "T".

In step S506, the degraded flow number threshold value when there is no link in is FIG. 21. Since the non-degraded flow number "3" is less than the non-degraded flow number threshold value ∞, it is remained as "R={L10}" in step S508. Thereafter, the processing is returned to step S502 again.

In step S502, it is assumed that v=L40. Thereby, there are obtained "L={L50}" and "T={L20, L50}". In step S504, the number of the non-degraded flows passing through v is "2". In step S505, the degraded flow set included in v is {F2, F3, F10}, so that the number of elements is "3". The degraded flow set included in the link L20 is {F2, F3, F10, F11}, so that the number of elements is "4". This is larger than the element number "3" of the degraded flow set included in the link v, and it includes the degraded flow set that is included in the link v. Thus, there are links that satisfy the condition in step S505.

In step S506, the non-degraded flow number threshold value corresponding to the case where there is a link is "1" in FIG. 21. Since the non-degraded flow number "2" passing through the link v is larger than the threshold value "1", there is obtained "R={L10, L40}" in step S508. Thereafter, the processing is returned to step S502 again.

In step S502, it is assumed that v=L50. Thereby, there are obtained "L={ }" and "T={L20}". In step S504, the number of the non-degraded flows passing through the link v is "2".

In step S505, the degraded flow set included in v is {F2}, so that the number of elements is "1". The degraded flow set included in the link L20 is {F2, F3, F10, F11}, so that the number of elements is "4". This is larger than the element number "1" of the degraded flow set included in the link v, and it includes the degraded flow set that is included in the link v. Thus, there are links that satisfy the condition in step S505.

In step S506, the non-degraded flow number threshold value corresponding to the case where there is a link is "1" in FIG. 21. Since the non-degraded flow number passing through the link v "2" is larger than the threshold value "1", there is obtained "R={L10, L40, L50}" in step S508. Thereafter, the processing is returned to step S502 again. In step S502, the set "L" of all the flows is an empty set, so that the processing is ended.

Therefore, "R={L10, L40, L50}" are eliminated as the non-degraded links to obtain the reduced flow/link table as shown in FIG. 23.

(Quality-Degraded Portion Estimating Unit 17)

The quality-degraded portion estimating unit 17 reads out the reduced flow quality/route table from the reduced flow quality/route table storage unit 16, and estimates the quality-degraded portion based on the reduced flow quality/route table by using the minimum link number estimating method.

With the fifth exemplary embodiment, it is possible to eliminate only the non-degraded link with sufficiently high probability when eliminating the non-degraded link.

Assuming that the degradation probabilities of each link are the same, it is considered that explaining the current degraded state with the degraded links of the smallest possible number can provide a proper explanation with still higher probability under the condition where the current degraded state has occurred. It is because the probability of having degradation of a plurality of links simultaneously becomes smaller as the number of links increases.

Therefore, when the number of links in the minimum link number estimation result increases by removing a given link as the non-degraded link, it is highly probable that the judgment made to consider the link as the non-degraded link is a mistake. Regarding the link v to which a given quality-degraded flow is added, if there is a degraded link that includes the degraded flow set included in the link v and has a large number of elements, it can be expected that the number of degraded links obtained as a result of the minimum link number estimation is remained equal or decreased when that link is eliminated. Presence of such link is checked in step S505-step S507 of the non-degraded link judging method (5), and non-degraded link elimination is performed only when there is such link. Therefore, it is possible to increase the probability of executing proper non-degraded link elimination by employing this exemplary embodiment.

Sixth Exemplary Embodiment

In the sixth exemplary embodiment, only the processing actions of the non-degraded link removing processing unit 15 of the quality-degraded portion estimating server 10 are different from those of the third exemplary embodiment. Thus, only the different points thereof will be described hereinafter.

(Non-Degraded Link Removing Unit 15)

The non-degraded link removing unit 15 periodically reads out the flow quality/route link table from a flow quality/route link table storage unit S14, and extracts a row of the flow (degraded flow) whose quality is worse than the degrading threshold value that is determined in advance. When there is a flow whose quality is worse than the degrading threshold value, the non-degraded link removing unit 15 eliminates a degraded link set R that is determined by a non-degraded link judging method (6), generates a reduced flow quality/route table by eliminating the quality information and flow rate information, and writes it to a reduced flow quality/route table storage unit S16.

(Non-Degraded Link Judging Method (6))

In the non-degraded link judging method (6) used by the non-degraded link removing unit 15, there is obtained a set of degraded flows that pass through all the links through which one or more degraded link passes. It is noted here that a degraded flow included in a given link means a degraded flow that passes through that link, and degraded flows included in a given link set means a set of degraded flows that pass through at least one of those links.

Further, it is assumed here that the flows having the flow quality information indicating a better quality than the non-degrading threshold value that is determined in advance are the non-degraded flows.

FIG. 24 shows a flowchart of the actions of the degraded-link judging method (6) performed by the non-degraded link removing unit 15 in the sixth exemplary embodiment.

In step S601, it is considered that a set of all the links through which the degraded flow passes as "L0" and "R" as an empty set. Further, it is assumed that "L=L0". When the set of all the links "L" is an empty set in step S602, the processing is ended. When the set of all the links "L" is not an empty set, a link v is selected from the set of all the links "L" and the link v is eliminated from the set of all the links "L" in step S503. It is assumed that "T" represents the set of all the links L0 from which the link v and the elements of "R" are eliminated.

It is judged in step S604 whether or not one or more non-degraded flow passes through the link v. When one or more non-degraded flow passes through the link v, the processing is shifted to step S605. If not, the processing is returned to step S602.

In step S605, there is obtained a set of degraded flows that are included in the link v. It is checked to find out if there is any link included in "T", which has a larger number of elements in the flow set than the element number of the flow set by one or more and includes the degraded flow set that is included in the link v.

In step S606, the non-degraded flow number threshold value according to the presence of the link checked in step S605 is determined from a corresponding table that is determined in advance.

In step S607, if the number of non-degraded flows passing through the link v is equal to or more than the non-degraded flow number threshold value obtained in step S606, the link v is added to the eliminated link set R in step S608. Thereafter, the processing is returned to step S602.

It is to be determined in advance in the corresponding table of the non-degraded flow rate threshold value used in step S606 that the non-degraded flow rate threshold value becomes ∞ when there is no link found in step S605.

The link included in the set R when the above-described procedure ends is the non-degraded link to be eliminated.

Next, described is the action of the non-degraded link removing unit 15 that uses the non-degraded link judging method 6 by referring to the case of the flow quality/route link table shown in FIG. 6.

It is assumed here that the number of elements and the non-degraded flow rate threshold value in step S606 are the values shown in FIG. 25. Further, the packet loss rate "2%" is considered as the degrading threshold value, and the packet loss rate "0.6%" is considered as the non-degrading threshold value.

First, those shown with thick frames in FIG. 26 are the degraded flows. Further, flows shown with lateral dotted lines are the non-degraded flows.

In step S601, L={L10, L20, L40, L50}, T={L10, L20, L40, L50}, and R={ }. In step S603, it is assumed that V=L10. Thereby, there are obtained "L={L20, L40, L50}" and "T={L20, L40, L50}".

In step S604, the number of non-degraded flows passing through v is "3". In step S605, the degraded flow set included in v is {F3, F11}, so that the number of elements is "2". The degraded flow set included in the link L20 is {F2, F3, F10, F11}, so that the number of elements is "4". This is larger than the element number "2" of the degraded flow set included in the link v, and it includes the degraded flow set that is included in the link v. Thus, there are links that satisfy the condition in step S605.

In step S606, the non-degraded flow rate threshold value corresponding to the case where there is a link is "60" in FIG. 25. Since the non-degraded flow rate "60" passing through the link v is equal to or larger than the threshold value "60", there is obtained "R={L10}" in step S608. The processing is returned to step S602 again.

In step S602, it is assumed that v=L20. Thereby, there are obtained "L={L40, L50}" and "T={L40, L50}". In step S604, the number of the non-degraded flow passing through v is "1". In step S605, the degraded flow set included in the link v is {F2, F3, F10, F11}, and a link that includes the flow set is not included in "T".

In step S606, the degraded flow number threshold value when there is no link is ∞ in FIG. 25. Since the total rate "20" of the non-degraded flows is less than the threshold value ∞, it is remained as "R={L10}" in step S608. Thereafter, the processing is returned to step S602 again.

In step S602, it is assumed that v=L40. Thereby, there are obtained "L={L50}" and "T={L20, L50}". In step S604, the number of the non-degraded flows passing through the link v is "2".

In step S605, the degraded flow set included in the link v is {F2, F3, F10}, so that the number of elements is "3". The degraded flow set included in the link L20 is {F2, F3, F10, F11}, so that the number of elements is "4". This is larger than the element number "3" of the degraded flow set included in the link v, and it includes the degraded flow set that is included in the link v. Thus, there are links that satisfy the condition in step S605.

In step S606, the non-degraded flow rate threshold value corresponding to the case where there is a link is "60" in FIG. 25. Since the total rate "110" of the non-degraded flows passing through the link v is larger than the non-degraded flow rate threshold value "60", there is obtained "R={L10, L40}" in step S608. Thereafter, the processing is returned to step S602 again.

In step S602, it is assumed that v=L50. Thereby, there are obtained "L={ }" and "T={L20}". In step S604, the number of the non-degraded flows passing through the link v is "2".

In step S605, the degraded flow set included in the link v is {F2}, so that the number of elements is "1". The degraded flow set included in the link L20 is {F2, F3, F10, F11}, so that the number of elements is "4". This is larger than the element number "1" of the degraded flow set included in the link v, and it includes the degraded flow set that is included in the link v. Thus, there are links that satisfy the condition in step S605.

In step S606, the non-degraded flow rate threshold value corresponding to the case where there is a link is "60" in FIG. 25. Since the total rate "40", of the non-degraded flows passing through the link v is less than the threshold value "60", there is obtained "R={L10, L40}" in step S608. Thereafter, the processing is returned to step S602 again. In step S602, the set "L" of all the flows is an empty set, so that the processing is ended.

Therefore, "R={L10, L40}" are eliminated as the non-degraded links so as to obtain the reduced flow/link table as shown in FIG. 27.

(Quality-Degraded Portion Estimating Unit 17)

The quality-degraded portion estimating unit 17 reads out the reduced flow quality/route table from the reduced flow quality/route table storage unit 16, and estimates the quality-degraded portion based on the reduced flow quality/route table by using the minimum link number estimating method.

With the sixth exemplary embodiment, it is possible to eliminate only the non-degraded link with sufficiently high probability by the non-degraded link removing unit 15.

Assuming that the degradation probabilities of each link are the same, it is considered that explaining the current degraded state with the degraded links of the smallest possible number can provide a proper explanation with still higher probability under the condition where the current degraded state has occurred. It is because the probability of having degradation of a plurality of links simultaneously becomes smaller as the number of links increases.

Therefore, when the number of links in the minimum link number estimation result increases by removing a given link as the non-degraded link, it is highly probable that the judgment made to consider the link as the non-degraded link is a mistake. Regarding the link v to which a given quality-degraded flow is added, if there is a degraded link that includes the degraded flow set included in the link v and has a large number of elements, it can be expected that the number of degraded links obtained as a result of the minimum link number estimation is remained equal or decreased when that link is eliminated.

With the sixth exemplary embodiment, presence of such link is checked in step S605-step S607 of the non-degraded link judging method 6, and non-degraded link elimination is performed only when there is such link. Therefore, it is possible to increase the probability of executing proper non-degraded link elimination by employing the sixth exemplary embodiment.

The specific examples of the quality-degraded portion estimating apparatus according to the present invention have been described above, and the execution steps of the contents including the quality-degraded portion estimating method have been disclosed in the section where the actions thereof are explained. In addition, regarding the steps for executing the contents performed by the quality-degraded portion estimating apparatus described above, the functions of each constituent device may be put into a program for allowing a computer to execute the functions.

As described above, it is possible with the present invention to execute the non-degraded link elimination with high accuracy in the manner described above. Therefore, it is possible to provide the quality-degraded portion estimating apparatus, the quality-degraded portion estimating method, and the quality-degraded portion estimating program, which have such an advantage that the degraded portion in terms of the communication quality in a communication network system can be estimated rapidly with high accuracy.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

As described above, it is possible with the present invention to estimate the quality-degraded portion in the communication network with higher accuracy and more rapidly than the conventional cases. Therefore, the present invention is highly applicable in various industrial fields using communication networks, namely a field of communication business, etc.

BRIEF DESCRIPTION OF THE DRAWINGS

FIG. 6 is a chart showing an example of a flow quality/route table;

FIG. 7 is a chart showing a process of non-degraded link elimination performed by using a non-degraded link judging method (1) according to the first exemplary embodiment shown in FIG. 1;

FIG. 8 is a chart showing a reduced flow quality/route table that is obtained by executing the non-degraded link judging method (1) shown in FIG. 7;

FIG. 9 is a chart showing a process of non-degraded link elimination performed by using a non-degraded link judging method (2) according to the second exemplary embodiment of the present invention;

FIG. 10 is a chart showing a reduced flow quality/route table that is obtained by executing the non-degraded link judging method (2) shown in FIG. 9;

FIG. 11 is a chart showing a reduced flow quality/route table that is obtained by a conventional non-degraded link judging method;

FIG. 13 is a chart showing corresponding relations between the included number of links and non-degraded flow number threshold values according to the third exemplary embodiment of the present invention;

FIG. 14 is a chart showing a process of non-degraded link elimination performed by using a non-degraded link judging method (3) according to the third exemplary embodiment of the present invention;

FIG. 15 is a chart showing a reduced flow quality/route table that is obtained by executing the non-degraded link judging method (3) shown in FIG. 14;

FIG. 17 is a chart showing corresponding relations between the included number of links and non-degraded flow number threshold values according to the fourth exemplary embodiment of the present invention;

FIG. 18 is a chart showing a process of non-degraded link elimination performed by using a non-degraded link judging method (4) according to the fourth exemplary embodiment of the present invention;

FIG. 19 is a chart showing a reduced flow quality/route table that is obtained by executing the non-degraded link judging method (4) shown in FIG. 18;

FIG. 21 is a chart showing corresponding relations between the included number of links and non-degraded flow number threshold values according to the fifth exemplary embodiment of the present invention;

FIG. 22 is a chart showing a process of non-degraded link elimination performed by using a non-degraded link judging method (5) according to the fifth exemplary embodiment of the present invention;

FIG. 23 is a chart showing a reduced flow quality/route table that is obtained by executing the non-degraded link judging method (5) shown in FIG. 22;

FIG. 25 is a chart showing corresponding relations between the included number of links and non-degraded flow number threshold values according to the sixth exemplary embodiment of the present invention;

FIG. 26 is a chart showing a process of non-degraded link elimination performed by using a non-degraded link judging method (6) according to the sixth exemplary embodiment of the present invention;

FIG. 27 is a chart showing a reduced flow quality/route table that is obtained by executing the non-degraded link judging method (6) shown in FIG. 26;

FIG. 30 is an example of a flow-link corresponding table in the network of FIG. 28;

FIG. 31 is a chart showing an example of non-degraded link removing processing according to a conventional case;

Figure 32:
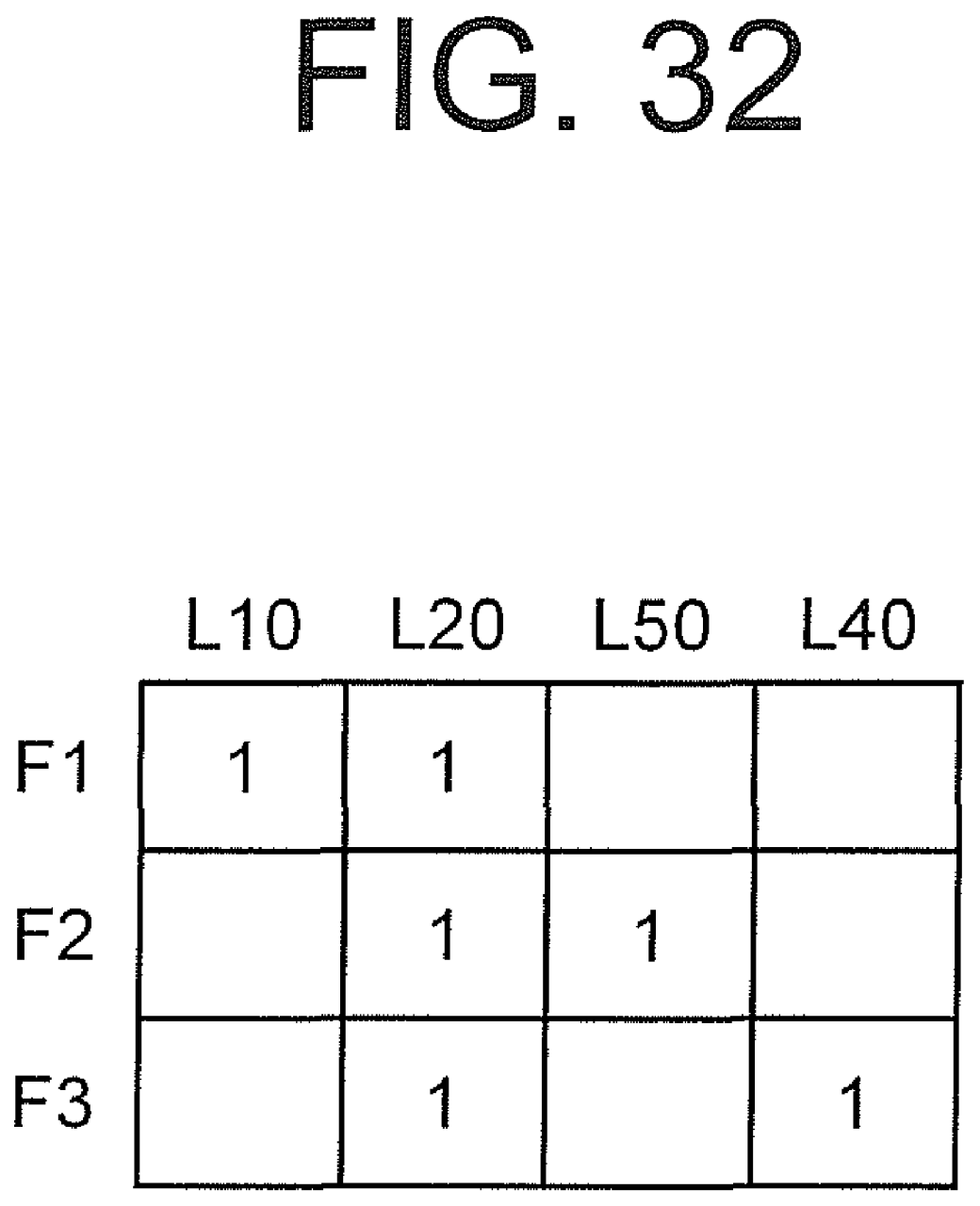

FIG. 32 is an example of a reduced flow/link corresponding table of the conventional case;

FIG. 33 is an example of wrong non-degraded link removing processing performed in the conventional case;

FIG. 34 is an example of a wrong reduced flow-link corresponding table according to the conventional case;

FIG. 35 is another example of the wrong non-degraded link removing processing performed in the conventional case; and FIG. 36 is another example of the wrong reduced flow-link corresponding table according to the conventional case.

REFERENCE NUMERALS

Figure 1:
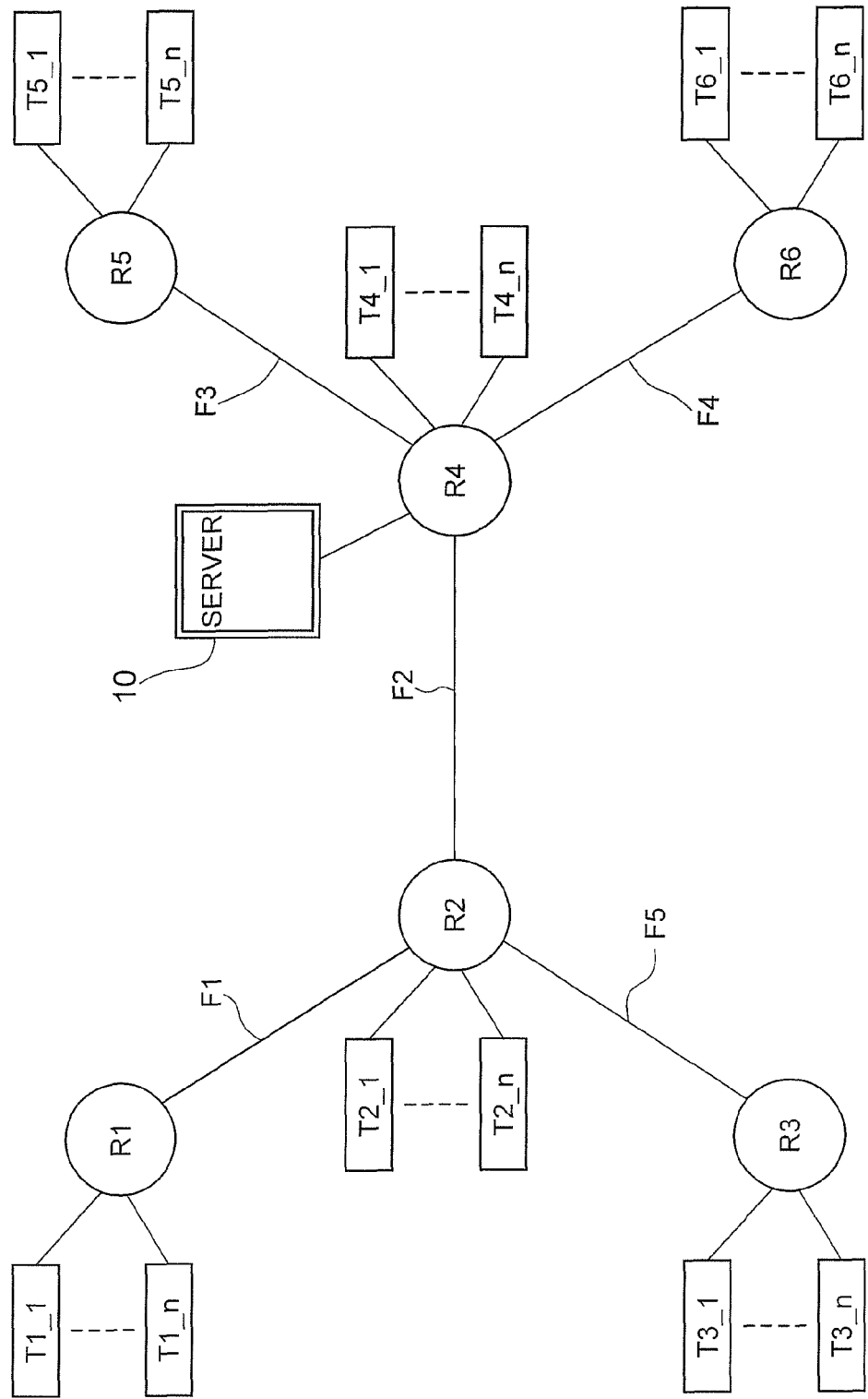
FIG. 1 is an illustration for describing a network structure and a flow example according to a first exemplary embodiment of the present invention.
Figure 2:
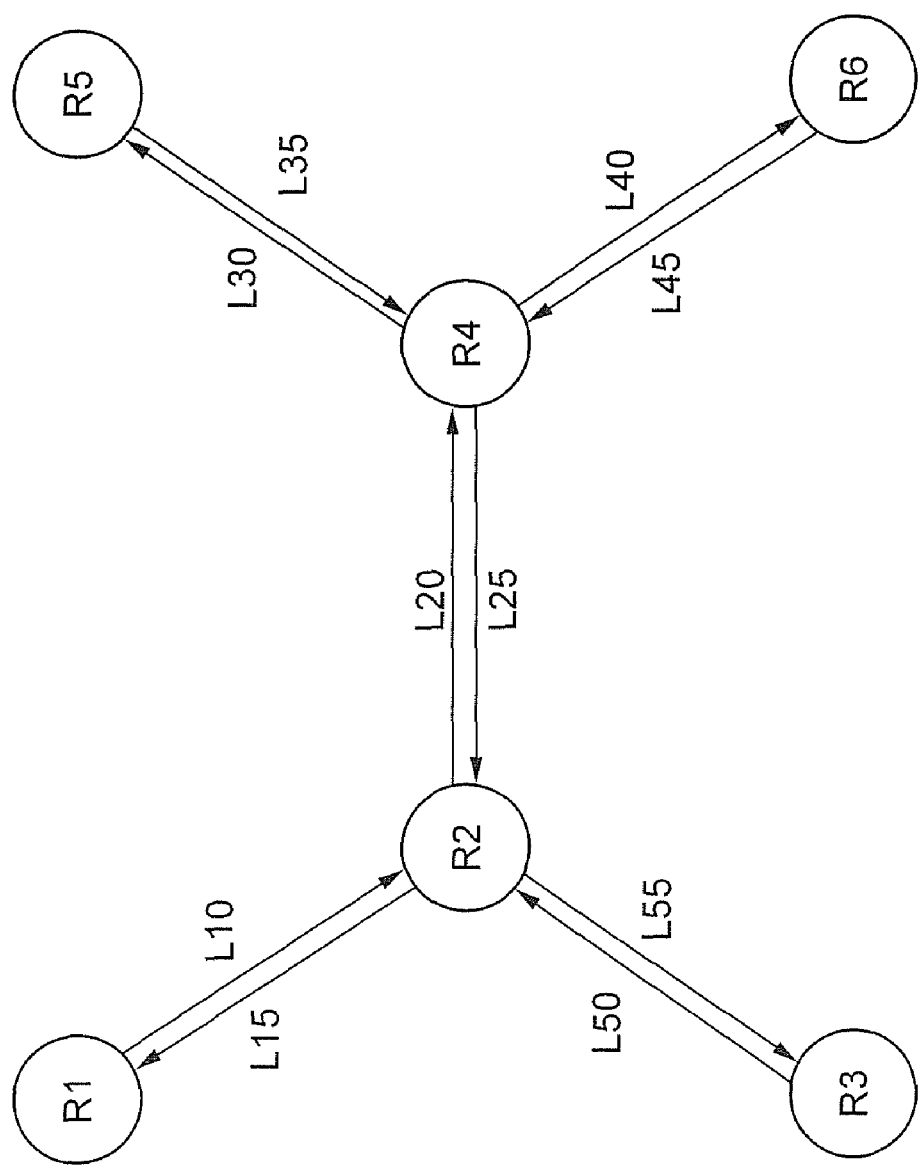
FIG. 2 is an illustration for describing link names in the network of the exemplary embodiment shown in FIG. 1.
Figure 3:
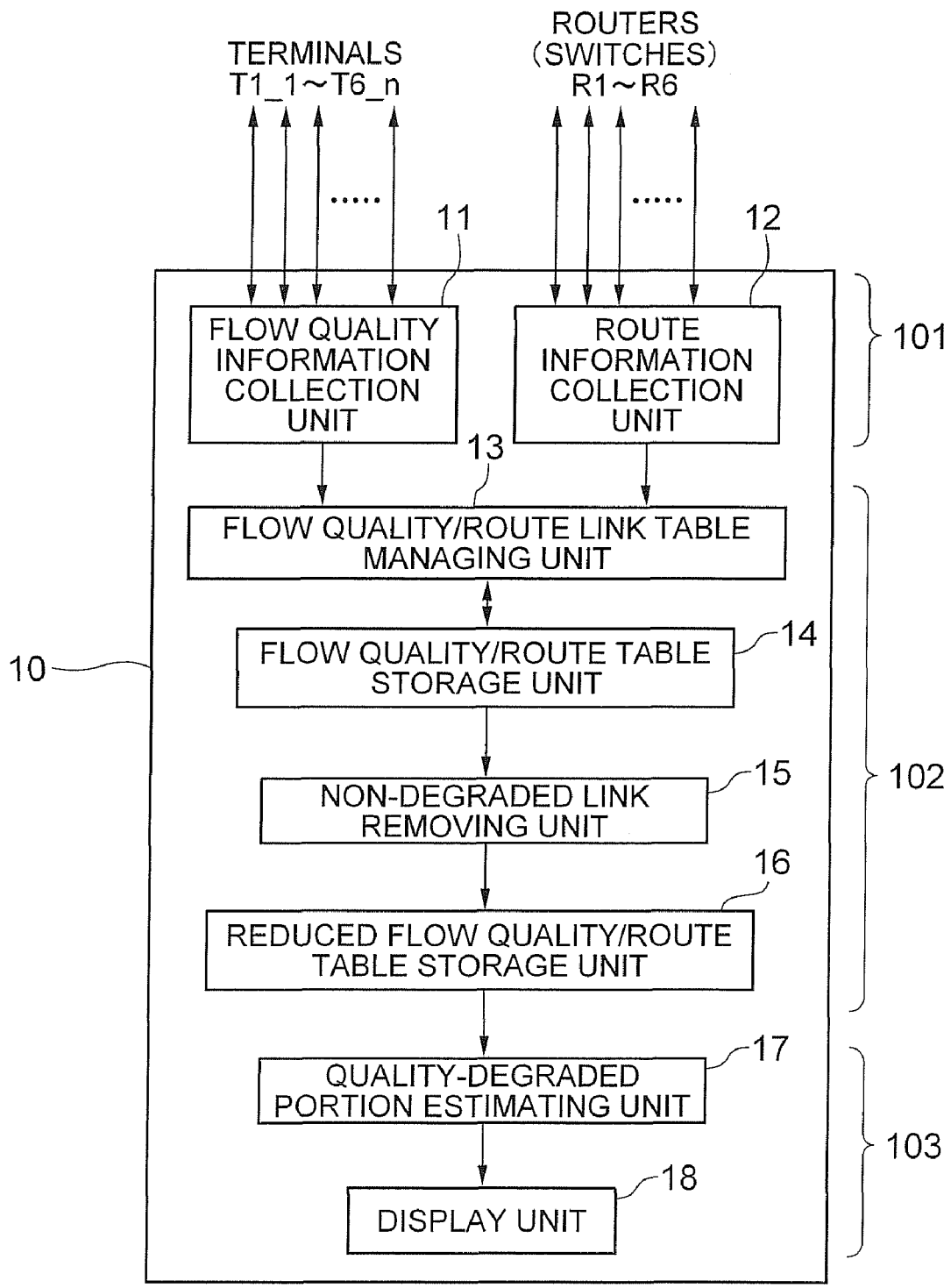
FIG. 3 is a block diagram showing a structure of a quality-degraded portion estimating server of the exemplary embodiment shown in FIG. 1.
Figure 4:
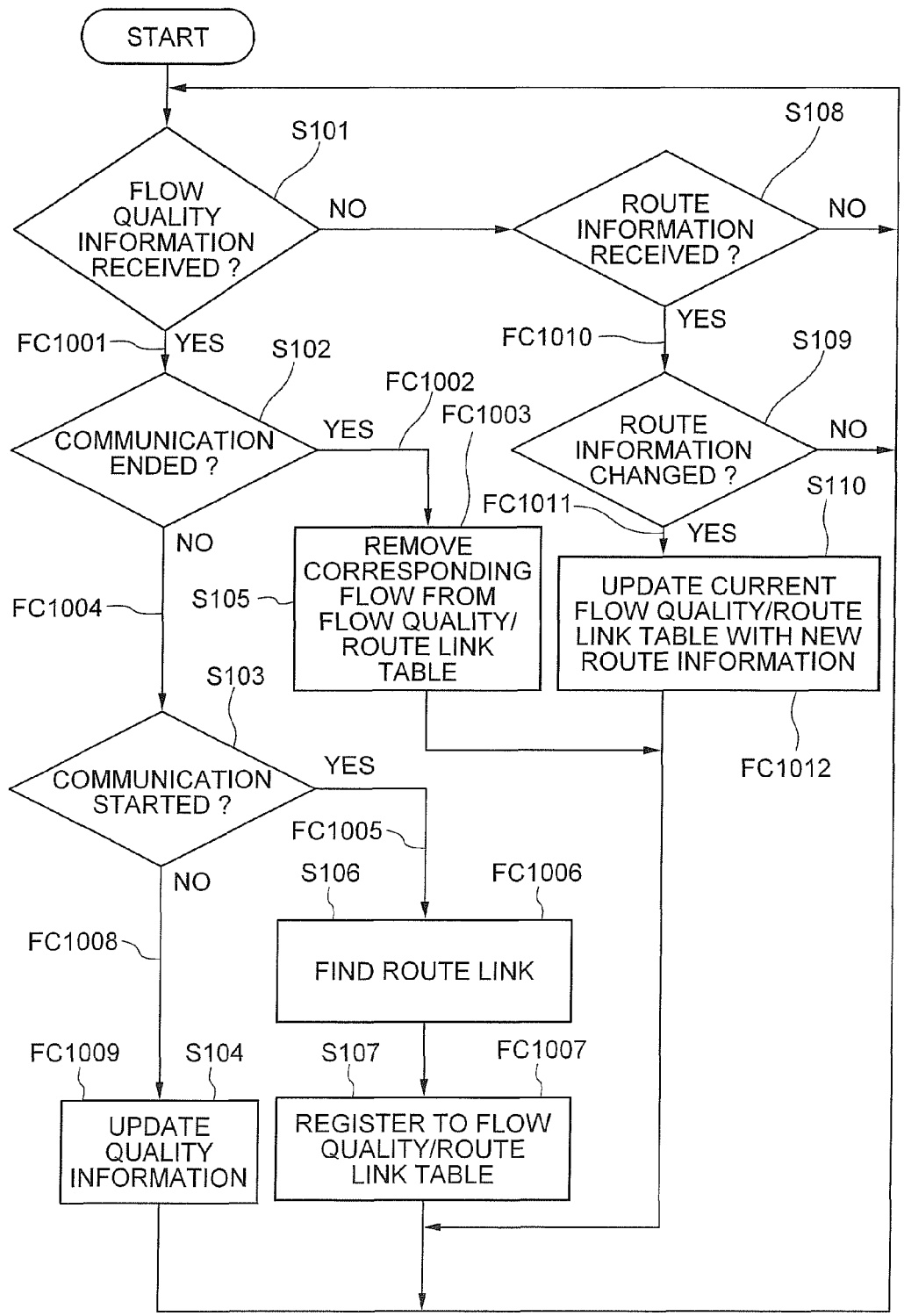
FIG. 4 is a flowchart showing actions of a flow quality/route table managing unit according to the first exemplary embodiment shown in FIG. 1.
Figure 5:
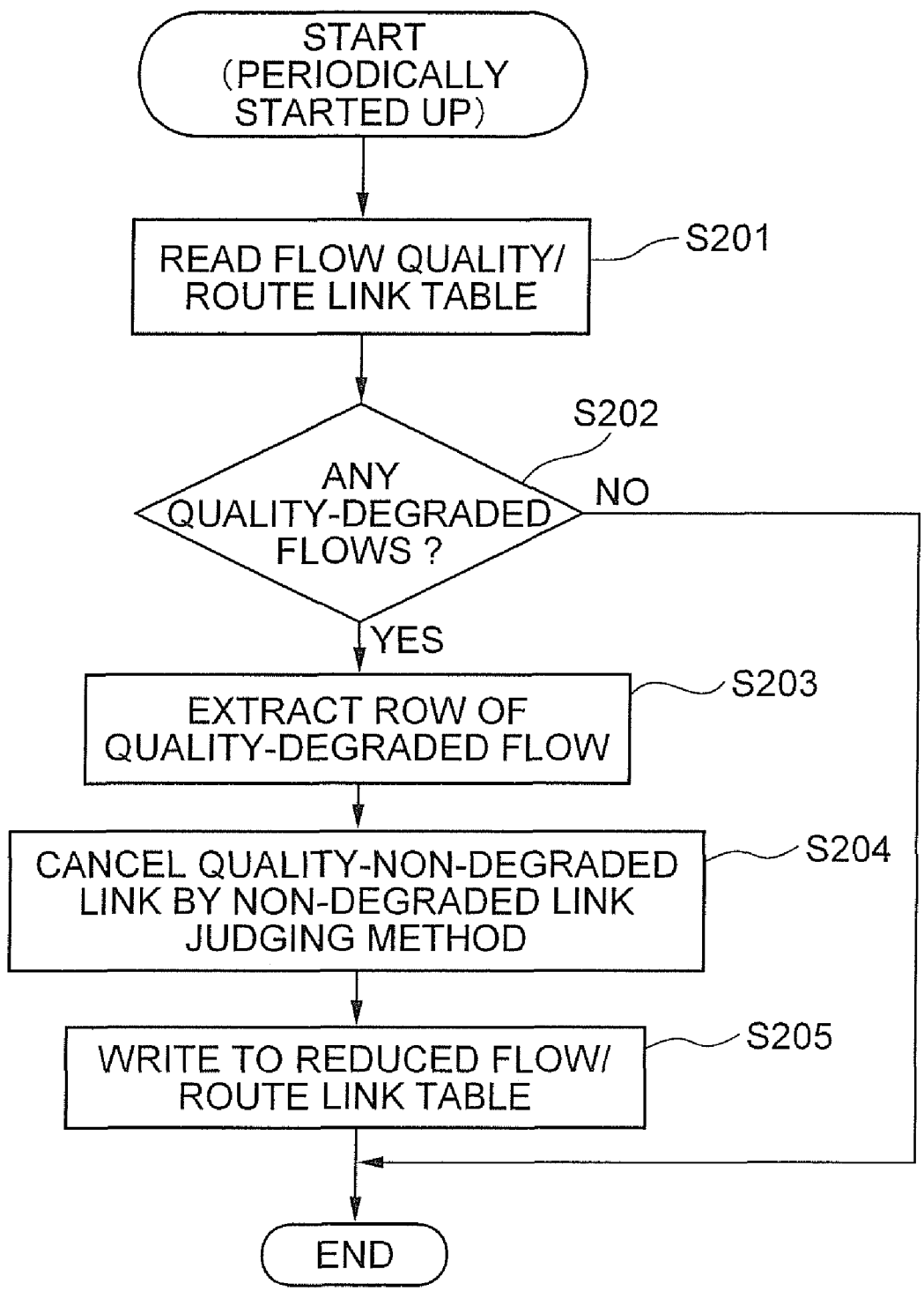
FIG. 5 is a flowchart showing actions of a non-degraded link removing unit according to the first exemplary embodiment shown in FIG. 1.
Figure 12:
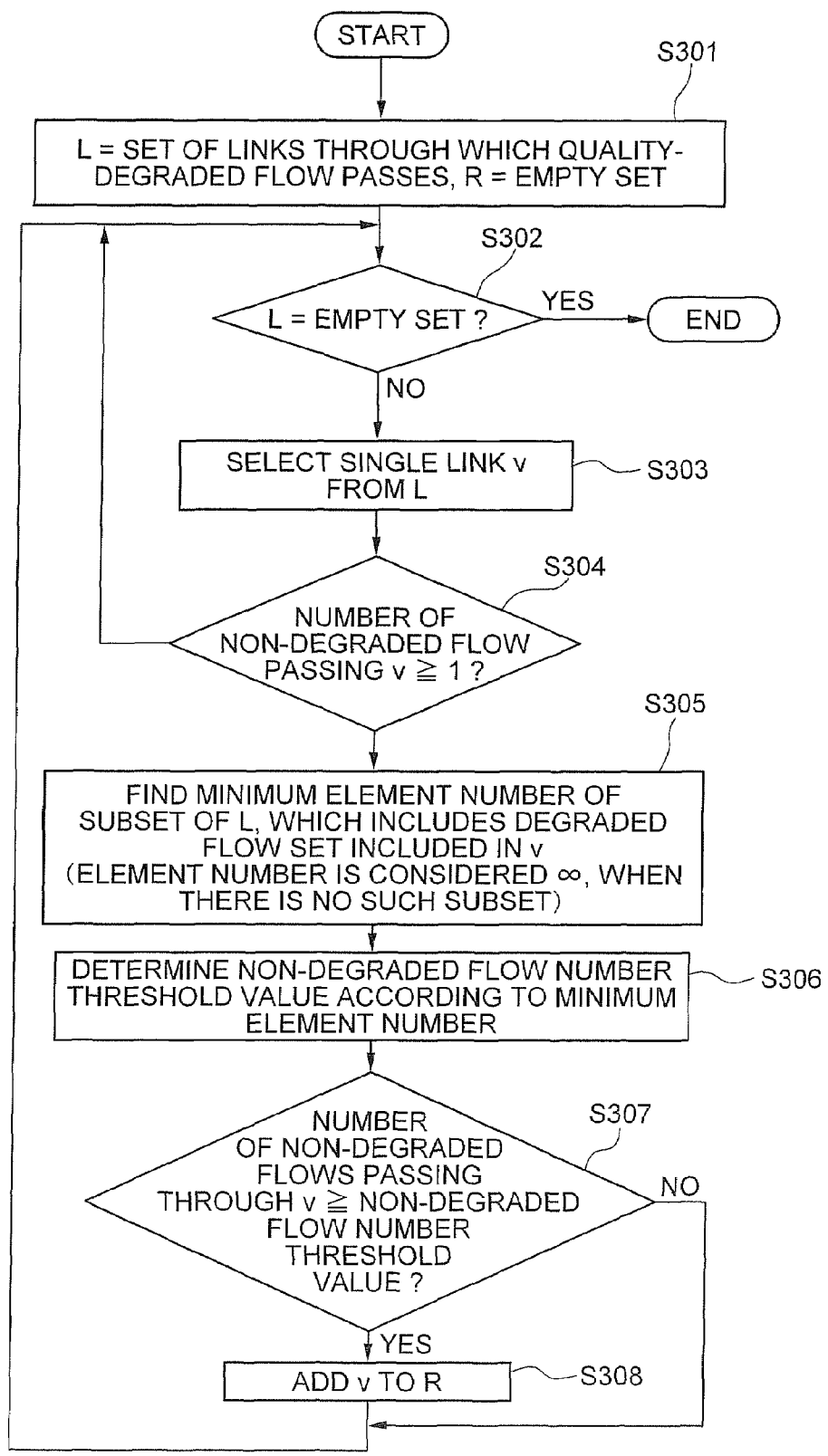
FIG. 12 is a flowchart showing actions of a non-degraded link removing unit according to a third exemplary embodiment of the present invention.
Figure 16:
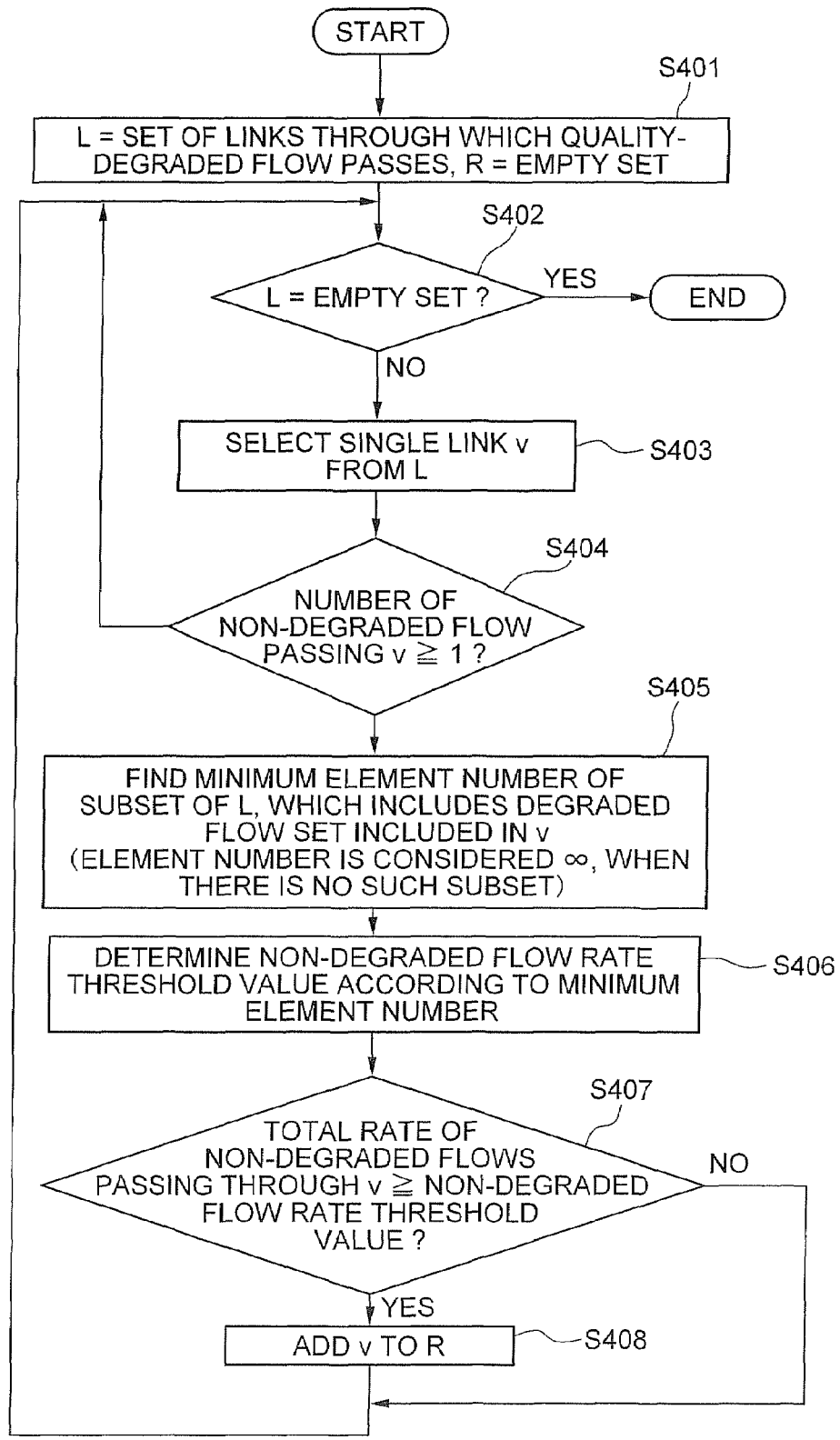
FIG. 16 is a flowchart showing actions of a non-degraded link removing unit according to a fourth exemplary embodiment of the present invention.
Figure 20:
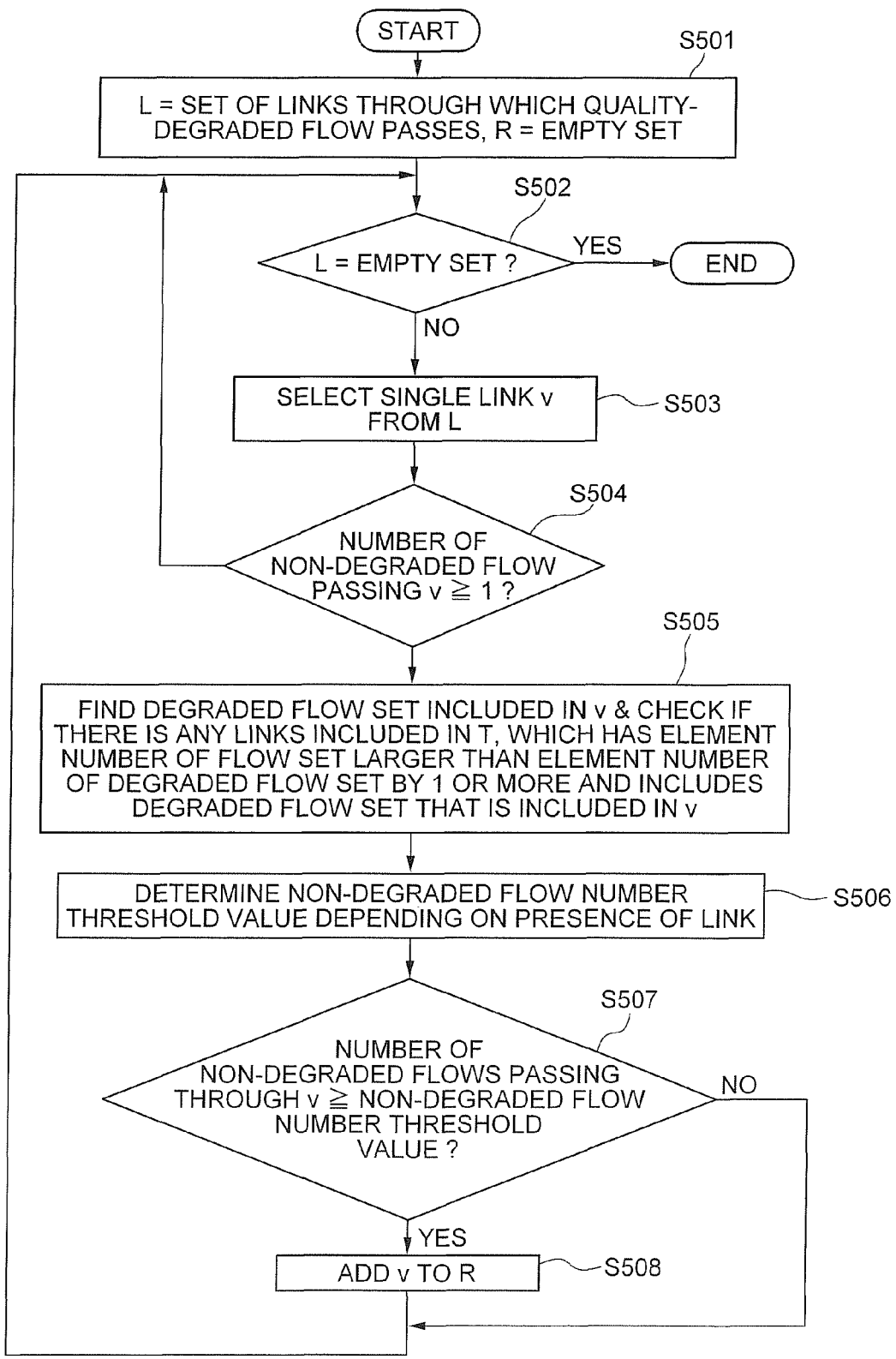
FIG. 20 is a flowchart showing actions of a non-degraded link removing unit according to a fifth exemplary embodiment of the present invention.
Figure 24:
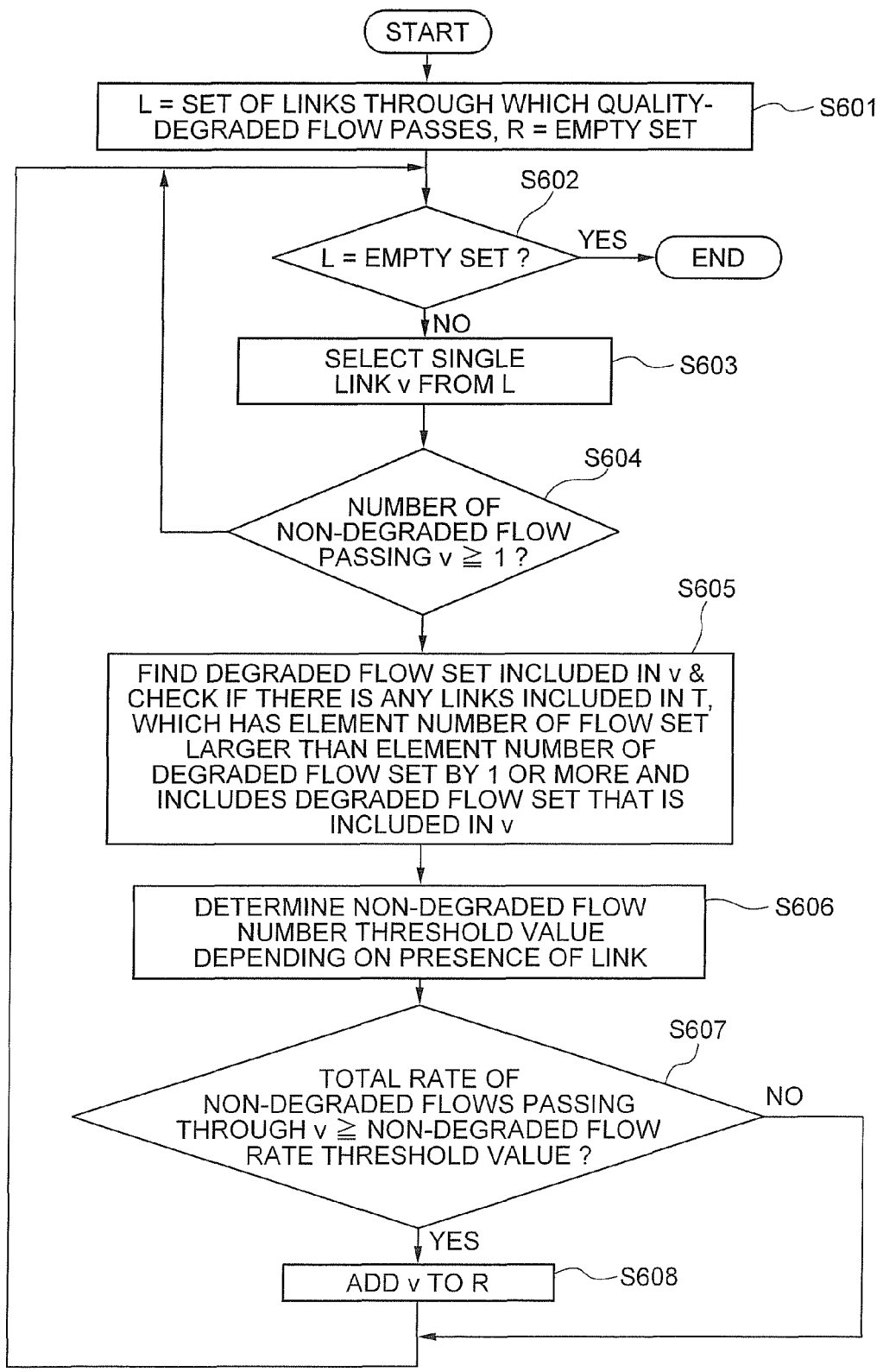
FIG. 24 is a flowchart showing actions of a non-degraded link removing unit according to a sixth exemplary embodiment of the present invention.
Figure 28:
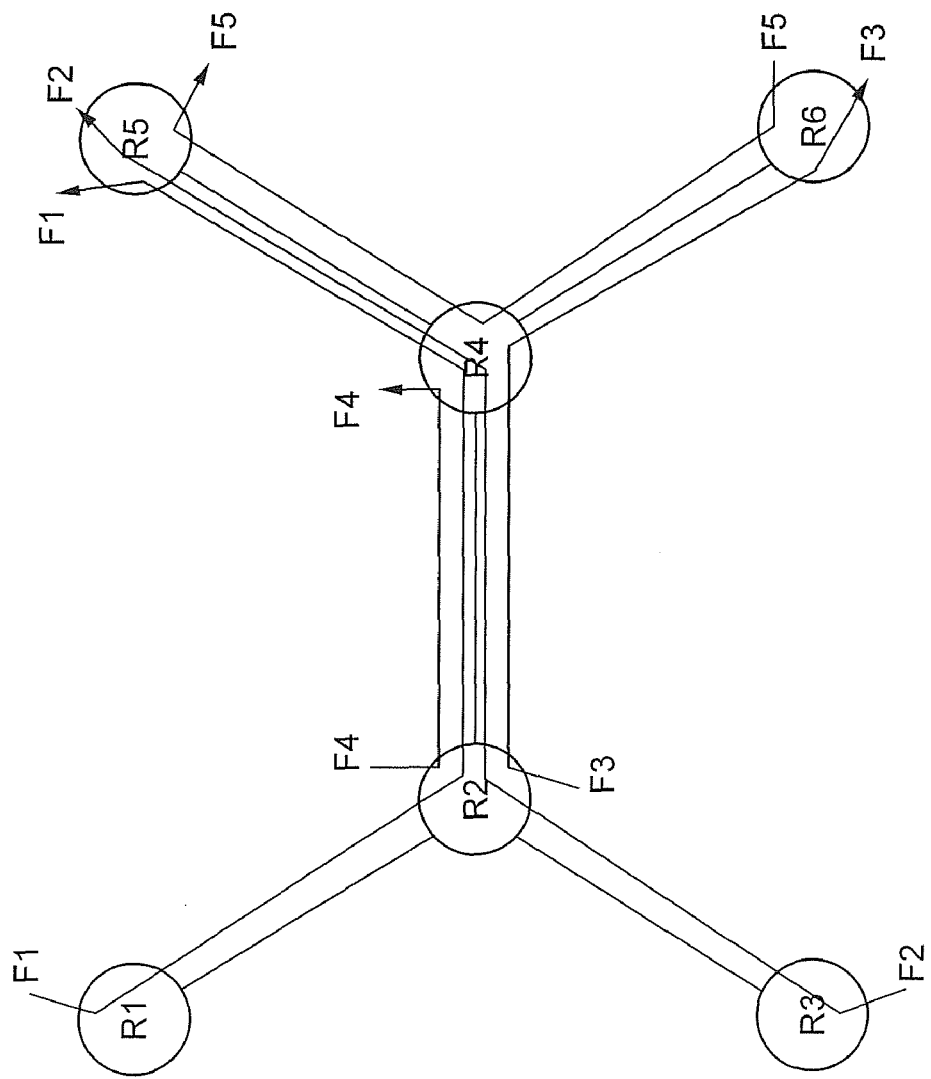
FIG. 28 is an illustration for describing a network structure and a flow example.
Figure 29:
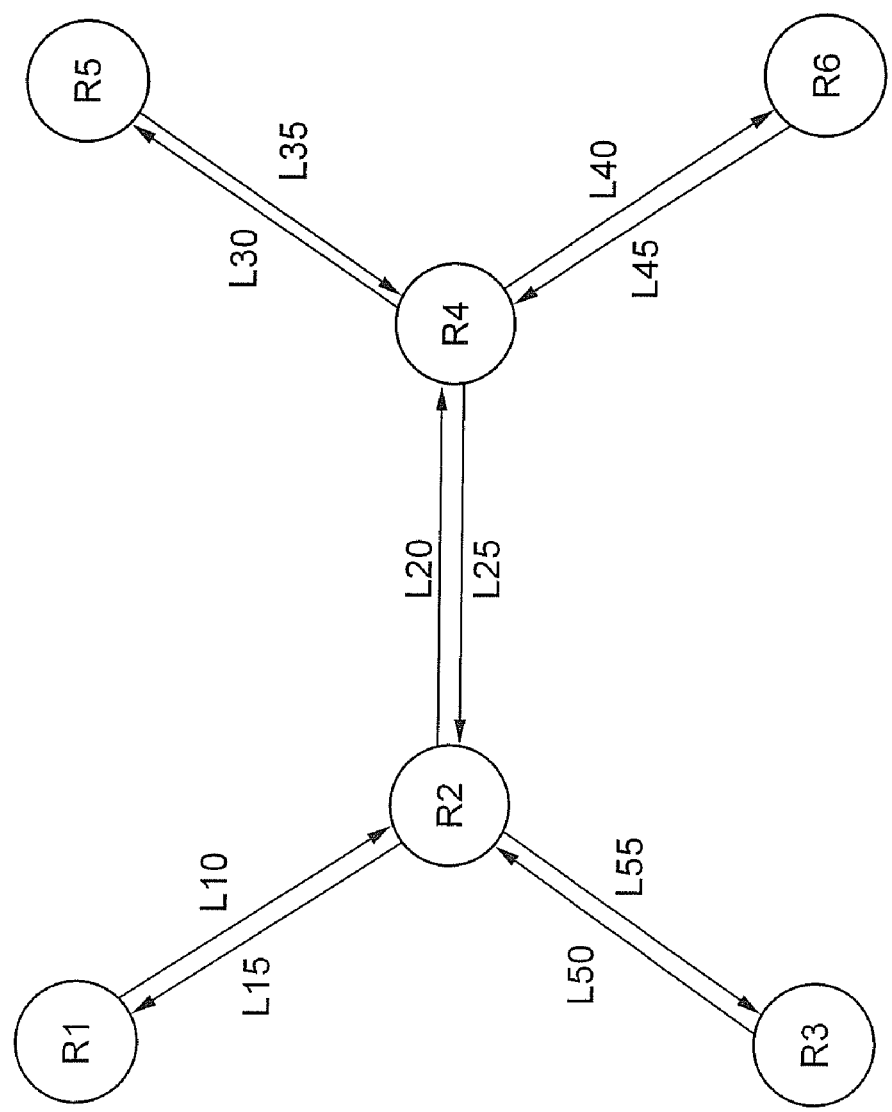
FIG. 29 is an illustration for describing link names in the network of FIG. 28.

10 Quality-degraded portion estimating server (quality-degraded portion estimating apparatus)
11 Flow quality information collection unit (flow quality information collection device)
12 Route information collection unit (route information collection device)
13 Flow quality/route link table managing unit (flow quality/route link table managing device)
14 Flow quality/route link table storage unit (flow quality/route link table storage device)
15 Non-degraded link removing unit (non-degraded link removing device)
16 Reduced flow quality/route link table storage unit (reduced flow quality/route link table storage device)
17 Quality-degraded portion estimating unit (quality-degraded portion estimating device)
18 Display unit (display device)
101 Information collection device
102 Reduced degraded-flow/quality-degraded flow determining device
103 Quality-degraded portion estimating device
R1-R6 Routers (packet switches)
TR1-TR5 Reception terminals
TS1-TS5 Transmission terminals

The invention claimed is:

1. A quality-degraded portion estimating apparatus, comprising:
an information collection device for collecting quality information and flow rates of flows circulated in a network as well as structural information of the network;
a quality-degraded flow/quality-non-degraded flow determining device for finding links through which the flows pass from the flow quality information and the network structural information collected by the information collection device, and determining quality-degraded flows and quality-non-degraded flows based on a degrading threshold value and a non-degrading threshold value determined in advance; and
a quality-degraded portion estimating device for, from a set of the links through which the quality-degraded flows pass, outputting as quality-degraded portions, a subset having a minimum element number and including a link through which an arbitrary flow among the quality-degraded flows passes, which is among subsets of the link set from which the link having number of passing quality-non-degraded flows equal to or larger than a non-degraded flow number threshold value that is determined based on the degrading threshold value and the flow rate is eliminated,
wherein the quality-degraded flow/quality-non-degraded flow determining device changes, for a set of the quality-degraded flows that pass a link through which a given quality-non-degraded flow passes, the non-degraded flow number threshold value depending on number of elements of a set configured with minimum number of links among link sets in which a set of flows configured with quality-degraded flows that pass any of links of a link set through which any of the flows in the quality-degraded flow set passes includes the set of the quality-degraded flows, and
wherein, when the non-degraded flow number threshold value becomes high such that a link having more than a prescribed number of the non-degraded flow is eliminated, the quality-degraded portion estimating device finds the link as a non-degraded link with which a number of a link set through which the quality-degraded flows pass increases.

2. A quality-degraded portion estimating apparatus, comprising:
an information collection device for collecting quality information and flow rates of flows circulated in a network as well as structural information of the network;
a quality-degraded flow/quality-non-degraded flow determining device for finding links through which the flows pass from the flow quality information and the network structural information collected by the information collection device, and determining quality-degraded flows and quality-non-degraded flows based on a degrading threshold value and a non-degrading threshold value determined in advance; and
a quality-degraded portion estimating device for, from a set of the links through which the quality-degraded flows pass, outputting as quality-degraded portions, a subset having a minimum element number and including a link through which an arbitrary flow among the quality-degraded flows passes, which is among subsets of the link set from which the link having number of passing quality-non-degraded flows equal to or larger than a non-degraded flow number threshold value that is determined based on the degrading threshold value and the flow rate is eliminated,
wherein the quality-degraded flow/quality-non-degraded flow determining device changes, for a set of the quality-degraded flows that pass a link through which a given quality-non-degraded flow passes, the non-degraded flow number threshold value depending on presence of a link through which all the flows in the set of the quality-degraded flows pass and one or more quality-degraded flow that is not included in the set of the quality-degrade flows passes.

3. A quality-degraded portion estimating apparatus, comprising:
an information collection device for collecting quality information and flow rates of flows circulated in a network as well as structural information of the network;
a quality-degraded flow/quality-non-degraded flow determining device for finding links through which the flows pass from the flow quality information and the network structural information collected by the information collection device, and determining quality-degraded flows and quality-non-degraded flows based on a degrading threshold value and a non-degrading threshold value determined in advance; and
a quality-degraded portion estimating device for, from a set of the links through which the quality-degraded flows pass, outputting as quality-degraded portions, a subset having a minimum element number and including a link through which an arbitrary flow among the quality-degraded flows passes, which is among subsets of the link set from which the link having total rate of passing quality-non-degraded flows equal to or larger than a non-degraded flow rate threshold value that is determined based on the degrading threshold value and the flow rate is eliminated, wherein the quality-degraded flow/quality-non-degraded flow determining device changes, for a set of the quality-degraded flows that pass a link through which a given quality-non-degraded flow passes, the non-degraded flow rate threshold value depending on number of elements of a set configured with minimum number of links among link sets that do not include the link, in which a set of flows configured with quality-degraded flows that pass any of links of a link set through which any of the flows in the quality-degraded flow set passes includes the set of the quality-degraded flows.

4. A quality-degraded portion estimating apparatus, comprising:

an information collection device for collecting quality information and flow rates of flows circulated in a network as well as structural information of the network;

a quality-degraded flow/quality-non-degraded flow determining device for finding links through which the flows pass from the flow quality information and the network structural information collected by the information collection device, and determining quality-degraded flows and quality-non-degraded flows based on a degrading threshold value and a non-degrading threshold value determined in advance; and a quality-degraded portion estimating device for, from a set of the links through which the quality-degraded flows pass, outputting as quality-degraded portions, a subset having a minimum element number and including a link through which an arbitrary flow among the quality-degraded flows passes, which is among subsets of the link set from which the link having total rate of passing quality-non-degraded flows equal to or larger than a non-degraded flow rate threshold value that is determined based on the degrading threshold value and the flow rate is eliminated, wherein the quality-degraded flow/quality-non-degraded flow determining device changes, for a set of the quality-degraded flows that pass a link through which a given quality-non-degraded flow passes, the non-degraded flow rate threshold value depending on presence of a link through which all the flows in the set of the quality-degraded flows pass, and wherein, when the non-degraded flow number threshold value becomes high such that a link having more than a prescribed number of the non-degraded flow is eliminated, the quality-degraded portion estimating device finds the link as a non-degraded link with which a number of a link set through which the quality-degraded flows pass increases.

5. A quality-degraded portion estimating method, comprising:

collecting quality information and flow rates of flows circulated in a network as well as structural information of the network;

finding links through which the flows pass from the flow quality information and the network structural information collected by the information collection device, and determining quality-degraded flows and quality-non-degraded flows based on a degrading threshold value and a non-degrading threshold value determined in advance; and from a set of the links through which the quality-degraded flows pass, outputting as quality-degraded portions, a subset having a minimum element number and including a link through which an arbitrary flow among the quality-degraded flows passes, which is among subsets of the link set from which the link having number of passing quality-non-degraded flows equal to or larger than a non-degraded flow number threshold value that is determined based on the degrading threshold value and the flow rate is eliminated, wherein in determining quality-degraded flows and quality-non-degraded flows based on a degrading threshold value and a non-degrading threshold value determined in advance, the non-degraded flow number threshold value is changed, for a set of the quality-degraded flows that pass a link through which a given quality-non-degraded flow passes, depending on number of elements of a set configured with minimum number of links among link sets in which a set of flows configured with quality-degraded flows that pass any of links of a link set through which any of the flows in the quality-degraded flow set passes includes the set of the quality-degraded flows, and wherein, when the non-degraded flow number threshold value becomes high such that a link having more than a prescribed number of the non-degraded flow is eliminated, the quality-degraded portion estimating device finds the link as a non-degraded link with which a number of a link set through which the quality-degraded flows pass increases.

6. A quality-degraded portion estimating method, comprising:

collecting quality information and flow rates of flows circulated in a network as well as structural information of the network;

finding links through which the flows pass from the flow quality information and the network structural information collected by the information collection device, and determining quality-degraded flows and quality-non-degraded flows based on a degrading threshold value and a non-degrading threshold value determined in advance; and from a set of the links through which the quality-degraded flows pass, outputting as quality-degraded portions, a subset having a minimum element number and including a link through which an arbitrary flow among the quality-degraded flows passes, which is among subsets of the link set from which the link having number of passing quality-non-degraded flows equal to or larger than a non-degraded flow number threshold value that is determined based on the degrading threshold value and the flow rate is eliminated, wherein in determining quality-degraded flows and quality-non-degraded flows based on a degrading threshold value and a non-degrading threshold value determined in advance, the non-degraded flow number threshold value is changed, for a set of the quality-degraded flows that pass a link through which a given quality-non-degraded flow passes, depending on presence of a link through which all the flows in the set of the quality-degraded flows pass and one or more quality-degraded flow that is not included in the set of the quality-degrade flows passes.

7. A quality-degraded portion estimating method, comprising:
    collecting quality information and flow rates of flows circulated in a network as well as structural information of the network;
    finding links through which the flows pass from the flow quality information and the network structural information collected by the information collection device, and determining quality-degraded flows and quality-non-degraded flows based on a degrading threshold value and a non-degrading threshold value determined in advance; and
    from a set of the links through which the quality-degraded flows pass, outputting as quality-degraded portions, a subset having a minimum element number and including a link through which an arbitrary flow among the quality-degraded flows passes, which is among subsets of the link set from which the link having total rate of passing quality-non-degraded flows equal to or larger than a non-degraded flow rate threshold value that is determined based on the degrading threshold value and the flow rate is eliminated,
    wherein in determining quality-degraded flows and quality-non-degraded flows based on a degrading threshold value and a non-degrading threshold value determined in advance, the non-degraded flow rate threshold value is changed, for a set of the quality-degraded flows that pass a link through which a given quality-non-degraded flow passes, depending on number of elements of a set configured with minimum number of links among link sets that do not include the link, in which a set of flows configured with quality-degraded flows that pass any of links of a link set through which any of the flows in the quality-degraded flow set passes includes the set of the quality-degraded flows.

8. A quality-degraded portion estimating method, comprising:
    collecting quality information and flow rates of flows circulated in a network as well as structural information of the network;
    finding links through which the flows pass from the flow quality information and the network structural information collected by the information collection device, and determining quality-degraded flows and quality-non-degraded flows based on a degrading threshold value and a non-degrading threshold value determined in advance; and
    from a set of the links through which the quality-degraded flows pass, outputting as quality-degraded portions, a subset having a minimum element number and including a link through which an arbitrary flow among the quality-degraded flows passes, which is among subsets of the link set from which the link having total rate of passing quality-non-degraded flows equal to or larger than a non-degraded flow rate threshold value that is determined based on the degrading threshold value and the flow rate is eliminated,
    wherein in determining quality-degraded flows and quality-non-degraded flows based on a degrading threshold value and a non-degrading threshold value determined in advance, the non-degraded flow rate threshold value is changed, for a set of the quality-degraded flows that pass a link through which a given quality-non-degraded flow passes, depending on presence of a link through which all the flows in the set of the quality-degraded flows pass, and
    wherein, when the non-degraded flow number threshold value becomes high such that a link having more than a prescribed number of the non-degraded flow is eliminated, the quality-degraded portion estimating device finds the link as a non-degraded link with which a number of a link set through which the quality-degraded flows pass increases.

9. A non-transitory computer readable medium storing a quality-degraded portion estimating program for enabling a computer to execute:
    an information collection function which collects quality information and flow rates of flows circulated in a network as well as structural information of the network;
    a quality-degraded flow/quality-non-degraded flow determining function which finds links through which the flows pass from the flow quality information and the network structural information collected by the information collection device, and determines quality-degraded flows and quality-non-degraded flows based on a degrading threshold value and a non-degrading threshold value determined in advance; and
    a quality-degraded portion estimating function which, from a set of the links through which the quality-degraded flows pass, outputs as quality-degraded portions, a subset having a minimum element number and including a link through which an arbitrary flow among the quality-degraded flows passes, which is among subsets of the link set from which the link having number of passing quality-non-degraded flows equal to or larger than a non-degraded flow number threshold value that is determined based on the degrading threshold value and the flow rate is eliminated,
    wherein the quality-degraded flow/quality-non-degraded flow determining function is put into the program such that the computer works to change, for a set of the quality-degraded flows that pass a link through which a given quality-non-degraded flow passes, the non-degraded flow number threshold value depending on number of elements of a set configured with minimum number of links among link sets in which a set of flows configured with quality-degraded flows that pass any of links of a link set through which any of the flows in the quality-degraded flow set passes includes the set of the quality-degraded flows, and
    wherein, when the non-degraded flow number threshold value becomes high, the quality-degraded portion estimating device is put into the program such that the computer works to find a non-degraded link with which a number of a link set through which the quality-degraded flows pass increases.

10. A non-transitory computer readable medium storing a quality-degraded portion estimating program for enabling a computer to execute:
    an information collection function which collects quality information and flow rates of flows circulated in a network as well as structural information of the network;
    a quality-degraded flow/quality-non-degraded flow determining function which finds links through which the flows pass from the flow quality information and the network structural information collected by the information collection device, and determines quality-degraded flows and quality-non-degraded flows based on a degrading threshold value and a non-degrading threshold value determined in advance; and
    a quality-degraded portion estimating function which, from a set of the links through which the quality-degraded flows pass, outputs as quality-degraded portions, a subset having a minimum element number and including a link through which an arbitrary flow among the quality-degraded flows passes, which is among subsets of the link set from which the link having number of passing quality-non-degraded flows equal to or larger than a non-degraded flow number threshold value that is determined based on the degrading threshold value and the flow rate is eliminated, wherein the quality-degraded flow/quality-non-degraded flow determining function is put into the program such that the computer works to change, for a set of the quality-degraded flows that pass a link through which a given quality-non-degraded flow passes, the non-degraded flow number threshold value depending on presence of a link through which all the flows in the set of the quality-degraded flows pass and one or more quality-degraded flow that is not included in the set of the quality-degrade flows passes.

11. A non-transitory computer readable medium storing a quality-degraded portion estimating program for enabling a computer to execute:

an information collection function which collects quality information and flow rates of flows circulated in a network as well as structural information of the network;

a quality-degraded flow/quality-non-degraded flow determining function which finds links through which the flows pass from the flow quality information and the network structural information collected by the information collection device, and determines quality-degraded flows and quality-non-degraded flows based on a degrading threshold value and a non-degrading threshold value determined in advance; and a quality-degraded portion estimating function which, from a set of the links through which the quality-degraded flows pass, outputs as quality-degraded portions, a subset having a minimum element number and including a link through which an arbitrary flow among the quality-degraded flows passes, which is among subsets of the link set from which the link having total rate of passing quality-non-degraded flows equal to or larger than a non-degraded flow rate threshold value that is determined based on the degrading threshold value and the flow rate is eliminated, wherein the quality-degraded flow/quality-non-degraded flow determining function is put into the program such that the computer works to change, for a set of the quality-degraded flows that pass a link through which a given quality-non-degraded flow passes, the non-degraded flow rate threshold value depending on number of elements of a set configured with minimum number of links among link sets that do not include the link, in which a set of flows configured with quality-degraded flows that pass any of links of a link set through which any of the flows in the quality-degraded flow set passes includes the set of the quality-degraded flows.

12. A non-transitory computer readable medium storing a quality-degraded portion estimating program for enabling a computer to execute:

an information collection function which collects quality information and flow rates of flows circulated in a network as well as structural information of the network;

a quality-degraded flow/quality-non-degraded flow determining function which finds links through which the flows pass from the flow quality information and the network structural information collected by the information collection device, and determines quality-degraded flows and quality-non-degraded flows based on a degrading threshold value and a non-degrading threshold value determined in advance; and a quality-degraded portion estimating function which, from a set of the links through which the quality-degraded flows pass, outputs as quality-degraded portions, a subset having a minimum element number and including a link through which an arbitrary flow among the quality-degraded flows passes, which is among subsets of the link set from which the link having total rate of passing quality-non-degraded flows equal to or larger than a non-degraded flow rate threshold value that is determined based on the degrading threshold value and the flow rate is eliminated, wherein the quality-degraded flow/quality-non-degraded flow determining function is put into the program such that the computer works to change, for a set of the quality-degraded flows that pass a link through which a given quality-non-degraded flow passes, the non-degraded flow rate threshold value depending on presence of a link through which all the flows in the set of the quality-degraded flows pass, and wherein, when the non-degraded flow number threshold value becomes high such that a link having more than a prescribed number of the non-degraded flow is eliminated, the quality-degraded portion estimating device finds the link as a non-degraded link with which a number of a link set through which the quality-degraded flows pass increases.

* * * * *